US012617366B2

(12) United States Patent (10) Patent No.: US 12,617,366 B2
Katkar et al. (45) Date of Patent: May 5, 2026

(54) HORIZONTALLY INFLATING PASSENGER FRONT AIR BAG SYSTEM

(71) Applicant: Canoo Technologies Inc., Torrance, CA (US)

(72) Inventors: Vidyadhar V. Katkar, East Brunswick, NJ (US); Sangjoon Han, Fullerton, CA (US); Sohel Merchant, Rancho Palos Verdes, CA (US)

(73) Assignee: CANOO TECHNOLOGIES INC., Torrance, CA (US)

( * ) Notice: Subject to any disclaimer, the term of this patent is extended or adjusted under 35 U.S.C. 154(b) by 0 days.

(21) Appl. No.: 19/015,376

(22) Filed: Jan. 9, 2025

(65) Prior Publication Data

US 2025/0326369 A1 Oct. 23, 2025

Related U.S. Application Data

(60) Provisional application No. 63/619,009, filed on Jan. 9, 2024, provisional application No. 63/636,404, filed on Apr. 19, 2024.

(51) Int. Cl.
B60R 21/233 (2006.01)
B60R 21/01 (2006.01)
B60R 21/205 (2011.01)

(52) U.S. Cl.
CPC .......... B60R 21/233 (2013.01); B60R 21/205 (2013.01); *B60R 2021/01225* (2013.01); *B60R 2021/23324* (2013.01)

(58) Field of Classification Search
CPC ................ B60R 21/205; B60R 21/233; B60R 2021/01225; B60R 2021/23308; B60R 2021/23324
See application file for complete search history.

(56) References Cited

U.S. PATENT DOCUMENTS

| | | | |
|---|---|---|---|
| 5,577,765 A | * | 11/1996 | Takeda .................. B60R 21/233 |
| | | | 280/743.1 |
| 7,338,069 B2 | * | 3/2008 | Breed .................. B60R 21/205 |
| | | | 280/730.2 |

(Continued)

FOREIGN PATENT DOCUMENTS

| | | | | |
|---|---|---|---|---|
| JP | 2007145098 A | * | 6/2007 | ............. B60R 22/02 |
| JP | 2015016840 A | * | 1/2015 | ......... B60R 21/2334 |

OTHER PUBLICATIONS

Seki, K., et al., "Design Considerations of the Passenger Airbag System," The Thirteenth International Technical Conference on Experimental Safety Vehicles, Nov. 4-7, 1991, Paris, France, pp. 1127-1134.

(Continued)

*Primary Examiner* — Laura Freedman
(74) *Attorney, Agent, or Firm* — ALLEN, DYER, DOPPELT, + GILCHRIST, P.A.

(57) ABSTRACT

A vehicular airbag deployment system includes an airbag storage chamber, the airbag storage chamber disposed at a location within a vehicle. The vehicular airbag deployment system also includes an airbag configured to be stored within the airbag storage chamber when the airbag is in a deflated state. The airbag is further configured to be inflated in response to a collision detection event and deploy from the airbag storage chamber. In an inflated state, the airbag extends in a generally horizontal direction between a passenger seating location and a reaction surface at a front interior surface of the vehicle and the airbag contacts the reaction surface in the inflated state.

16 Claims, 20 Drawing Sheets

(56) References Cited

U.S. PATENT DOCUMENTS

| | | | | |
|---|---|---|---|---|
| 7,513,524 | B2 * | 4/2009 | Oota | B60R 21/18 |
| | | | | 280/733 |
| 7,695,002 | B2 * | 4/2010 | Choi | B60R 21/0136 |
| | | | | 180/268 |
| 8,408,593 | B2 * | 4/2013 | Kuhlmann | B60R 21/233 |
| | | | | 280/732 |
| 8,408,596 | B2 * | 4/2013 | Matsunaga | B60R 21/205 |
| | | | | 280/743.1 |
| 8,851,513 | B2 * | 10/2014 | Tsujimoto | B60R 21/231 |
| | | | | 280/732 |
| 9,434,343 | B2 * | 9/2016 | Motomochi | B60R 21/231 |
| 9,771,049 | B2 * | 9/2017 | Lee | B60R 21/213 |
| 9,821,751 | B2 * | 11/2017 | Pendse | B60R 21/239 |
| 10,029,643 | B2 * | 7/2018 | Spahn | B60R 21/239 |
| 10,336,279 | B2 * | 7/2019 | Farooq | B60R 21/231 |
| 10,946,825 | B2 * | 3/2021 | Ghannam | B60R 21/205 |
| 10,988,103 | B2 * | 4/2021 | Oh | B60R 21/239 |
| 11,186,248 | B2 * | 11/2021 | Tanaka | B60R 21/013 |
| 11,865,994 | B2 * | 1/2024 | Morita | B60R 21/231 |
| 11,904,787 | B1 * | 2/2024 | Chavez | B60R 21/205 |
| 11,945,395 | B1 * | 4/2024 | Farooq | B60R 21/233 |
| 12,269,413 | B1 * | 4/2025 | Taylor | B60R 21/2338 |
| 2005/0029781 | A1 * | 2/2005 | Enders | B60R 21/205 |
| | | | | 280/732 |
| 2005/0035578 | A1 * | 2/2005 | Arwood | B60R 21/26 |
| | | | | 280/732 |
| 2008/0054602 | A1 * | 3/2008 | Yang | B60R 21/231 |
| | | | | 280/736 |
| 2019/0009745 | A1 * | 1/2019 | Hikida | B60R 21/2346 |
| 2023/0391286 | A1 * | 12/2023 | Chavez | B60R 21/231 |

OTHER PUBLICATIONS

Park, W., "A Study of Airbag Design and Optimization Methodology," 25th International Technical Conference on the Enhanced Safety of Vehicles (ESV), Jun. 5-8, 2017, Detroit, Michigan, 13 pages.

* cited by examiner

300

303

304

306

302

400

104

Resistance to oppose direction of loading by wind shield

Direction of loading 304    300    306

PAB
~185 liter

404

Original distance
(No change)

V1 - Support volume

V2 – Occupant side volume

IVS - Internal vertical separator

COA - Controllable Orifice Area

LSP - Launch Support Pad

DV – Discrete vents

M – PAB container

800

LSP = 200X200x5 thk mm

814

BHB 75 mm

816

HORIZONTALLY INFLATING PASSENGER FRONT AIR BAG SYSTEM

CROSS-REFERENCE TO RELATED APPLICATIONS AND PRIORITY CLAIM

This application claims priority to U.S. Provisional Patent Application No. 63/619,009 filed Jan. 9, 2024, and U.S. Provisional Patent Application No. 63/636,404 filed Apr. 19, 2024. The content of the above-identified patent applications is incorporated herein by reference.

TECHNICAL FIELD

This disclosure relates generally to vehicular safety systems. More specifically, this disclosure relates to a horizontally inflating passenger front air bag system.

BACKGROUND

Vehicle platform architectures are becoming more unique, with some architectures having a higher longitudinal space between the driver and the windshield and a slim and smaller instrument panel than traditional vehicles. Due to this combination of a higher longitudinal space between the driver and windshield and a slimmer and smaller instrument panel, the necessary structural support for a passenger airbag is unavailable. Also, current airbags are deployed vertically and are designed to support/restrict the longitudinal movement of the occupant. However, this results in higher neck injury values and more chest deflection, both of which are crucial parameters for overall passenger safety and in obtaining 5-star safety rating performance.

SUMMARY

This disclosure relates to a horizontally inflating passenger front air bag system.

In certain embodiments, a vehicular airbag deployment system includes an airbag storage chamber, the airbag storage chamber disposed at a location within a vehicle. The vehicular airbag deployment system also includes an airbag configured to be stored within the airbag storage chamber when the airbag is in a deflated state. The airbag is further configured to be inflated in response to a collision detection event and deploy from the airbag storage chamber. In an inflated state, the airbag extends in a generally horizontal direction between a passenger seating location and a reaction surface at a front interior surface of the vehicle and the airbag contacts the reaction surface in the inflated state.

In some embodiments, the contact of the airbag and the reaction surface creates a resistance opposite a direction of loading of a passenger against the airbag.

In some embodiments, the reaction surface is a windshield of the vehicle.

In some embodiments, the airbag includes a front portion that, when the airbag is in the inflated state, extends to the passenger seating location, and a rear portion that, when the airbag is in the inflated state, extends to and contacts the reaction surface.

In some embodiments, the rear portion of the airbag has a height that is shorter than a height of the front portion of the airbag.

In some embodiments, the height of the front portion of the airbag is configured to extend between a torso of a passenger and a head level of the passenger.

In some embodiments, the contact of the rear portion of the airbag and the reaction surface creates a resistance opposite a direction of loading of a passenger against the front portion of the airbag.

In some embodiments, the airbag storage chamber is installed within an instrument panel of the vehicle.

In some embodiments, the airbag is configured to deploy from the airbag storage chamber in response to the collision detection event initially vertically from the instrument panel and inflate in the generally horizontal direction over the instrument panel.

In some embodiments, when the airbag is in the inflated state, the airbag has a length relative to the generally horizontal direction that exceeds a height of the airbag.

In some embodiments, the length of the airbag relative to the generally horizontal direction also exceeds a width of the airbag.

In some embodiments, the vehicular airbag deployment system also includes one or more sensors configured to detect safety parameters of the vehicle and an airbag control unit configured to identify the collision detection event using the detected safety parameters provided by the one or more sensors and trigger inflation and deployment of the airbag in response to the identification of the collision detection event.

In some embodiments, a volume of the airbag is equal to, less than, or more than 190 liters.

In certain embodiments, a method includes detecting a vehicular collision and triggering a collision detection event. The method also includes deploying, in response to the collision detection event, an airbag stored in a deflated state in an airbag storage chamber disposed at a location within a vehicle, including inflating the airbag to an inflated state. In the inflated state, the airbag extends in a generally horizontal direction between a passenger seating location and a reaction surface at a front interior surface of the vehicle and the airbag contacts the reaction surface in the inflated state.

In some embodiments, the airbag includes a front portion that, when the airbag is in the inflated state, extends to the passenger seating location and a rear portion that, when the airbag is in the inflated state, extends to and contacts the reaction surface.

In some embodiments, the rear portion of the airbag has a height that is shorter than a height of the front portion of the airbag and the height of the front portion of the airbag extends between a torso of a passenger and a head level of the passenger.

In some embodiments, the contact of the rear portion of the airbag and the reaction surface creates a resistance opposite a direction of loading of a passenger against the front portion of the airbag.

In some embodiments, the airbag storage chamber is installed within an instrument panel of the vehicle, and the method also includes deploying the airbag from the airbag storage chamber in response to the collision detection event initially vertically from the instrument panel and inflating in the generally horizontal direction over the instrument panel.

In some embodiments, when the airbag is in the inflated state, the airbag has a length relative to the generally horizontal direction that exceeds a height of the airbag and a width of the airbag.

In some embodiments, the method also includes detecting safety parameters of the vehicle using one or more sensors, identifying, by an airbag control unit, the collision detection event using the detected safety parameters provided by the one or more sensors, and triggering inflation and deployment of the airbag in response to the identification of the collision detection event.

In certain embodiments, a vehicular airbag deployment system includes an airbag storage chamber, the airbag storage chamber disposed at a location within a vehicle. The vehicular airbag deployment system also includes an airbag comprising a first volume and a second volume, which are configured to be stored within the airbag storage chamber when the airbag is in a deflated state. The airbag is further configured to be inflated in response to a collision detection event and deploy from the airbag storage chamber, wherein, in an inflated state, the second volume of the airbag extends in a generally horizontal direction towards a passenger seating location and the first volume of the airbag extends towards the launch pad and contacts the launch pad.

In some embodiments, the airbag includes an internal vertical separator separating the first volume from the second volume.

In some embodiments, the internal vertical separator of the airbag includes a controllable orifice area configured to manage a difference in pressure between the first volume and the second volume.

In some embodiments, a pressure of the first volume is higher than a pressure of the second volume.

In some embodiments, the airbag storage chamber is connected to another structural component of the vehicle.

In some embodiments, the structural component of the vehicle connected to the launch pad is a bullhorn beam.

In some embodiments, the other structural component of the vehicle connected to the airbag storage chamber is a cross car beam coupled to the bullhorn beam.

In some embodiments, the airbag includes a front portion comprising the second volume that, when the airbag is in the inflated state, extends to the passenger seating location and a rear portion comprising the first volume that, when the airbag is in the inflated state, extends vertically from the launch pad.

In some embodiments, the rear portion of the airbag has a height that is shorter than a height of the front portion of the airbag.

In some embodiments, the height of the front portion of the airbag is configured to extend between a torso of a passenger and a head level of the passenger.

In some embodiments, a pressure of the first volume of the rear portion of the airbag is higher than a pressure of the second volume of the front portion of the airbag, and the higher pressure of the first volume creates a resistance opposite a direction of loading of a passenger against the front portion of the airbag.

In some embodiments, when the airbag is in the inflated state, the airbag has a length relative to the generally horizontal direction that exceeds a height of the airbag.

In some embodiments, the length of the airbag relative to the generally horizontal direction also exceeds a width of the airbag.

In some embodiments, the vehicular airbag deployment system further includes one or more sensors configured to detect safety parameters of the vehicle and an airbag control unit. The airbag control unit is configured to identify the collision detection event using the detected safety parameters provided by the one or more sensors and trigger inflation and deployment of the airbag in response to the identification of the collision detection event.

In some embodiments, a combined volume of the first volume and the second volume of the airbag is approximately 145 liters, which is 20% to 30% lower than the volume of the current passenger air bags.

In certain embodiments, a method includes detecting a vehicular collision and triggering a collision detection event and deploying, in response to the collision detection event, an airbag having a first volume and a second volume, both the volumes stored in a deflated state in an airbag storage chamber disposed at a location within a vehicle, including inflating the airbag to an inflated state, and wherein, in an inflated state, the second volume of the airbag extends in a generally horizontal direction between a passenger seating location the first volume of the airbag and the first volume of the airbag extends towards the launch pad and contacts the launch pad.

In some embodiments, the airbag includes an internal vertical separator separating the first volume from the second volume, wherein the internal vertical separator of the airbag includes a controllable orifice area managing a difference in pressure between the first volume and the second volume, and wherein a pressure of the first volume is higher than a pressure of the second volume.

In some embodiments, the airbag includes a front portion comprising the second volume that, when the airbag is in the inflated state, extends to the passenger seating location and a rear portion comprising the first volume that, when the airbag is in the inflated state, extends vertically from the launch pad.

In some embodiments, the rear portion of the airbag has a height that is shorter than a height of the front portion of the airbag, wherein a pressure of the first volume of the rear portion of the airbag is higher than a pressure of the second volume of the front portion of the airbag, and wherein the higher pressure of the first volume creates a resistance opposite a direction of loading of a passenger against the front portion of the airbag.

In some embodiments, the method also includes detecting safety parameters of the vehicle using one or more sensors, identifying, by an airbag control unit, the collision detection event using the detected safety parameters provided by the one or more sensors, and triggering inflation and deployment of the airbag in response to the identification of the collision detection event.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
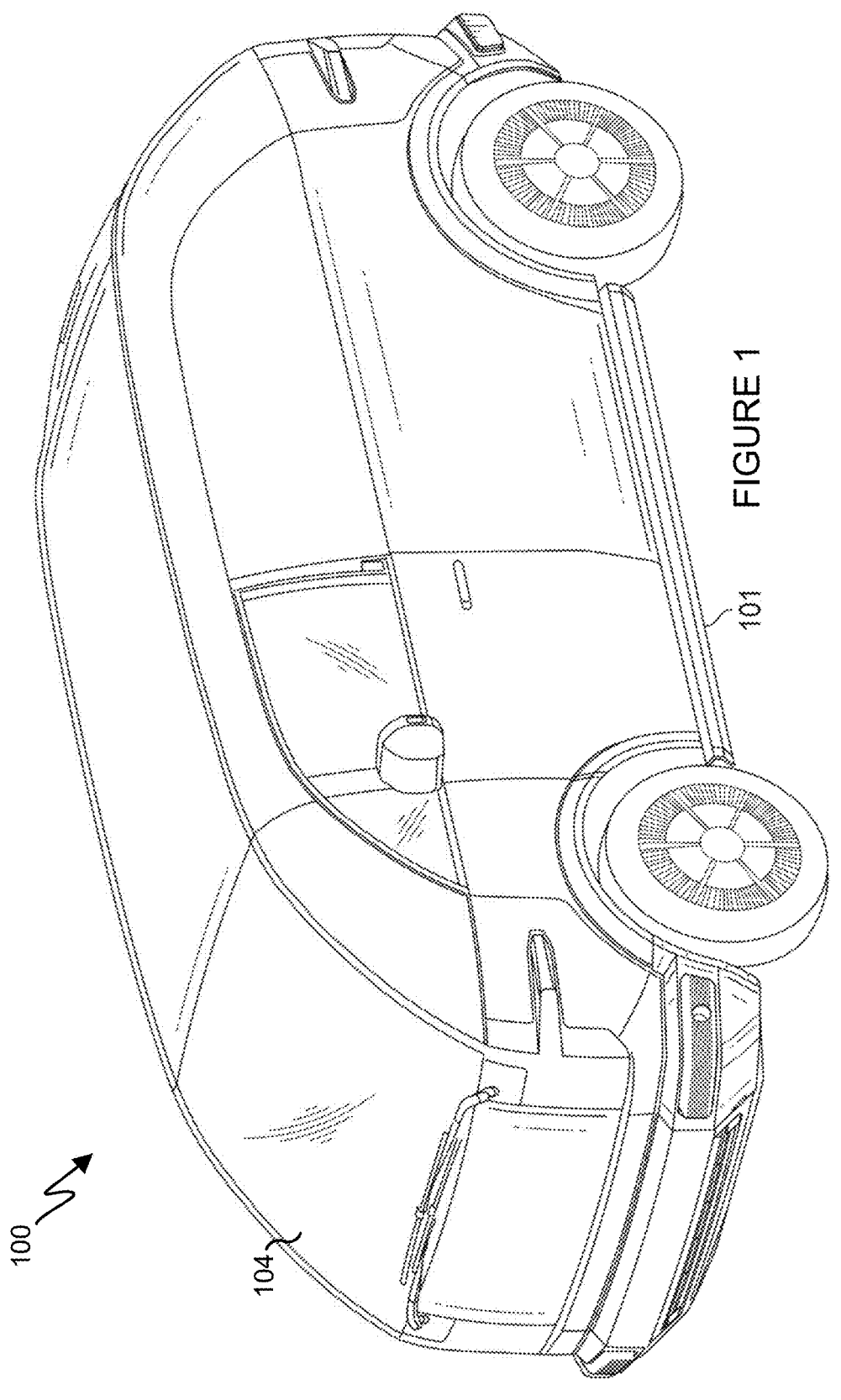
FIG. 1 illustrates an example electric vehicle in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

An airbag is a vehicle occupant-restraint system using a bag designed to inflate extremely quickly, then quickly deflate during a collision. It comprises an airbag cushion, a flexible fabric bag, an inflation module, and an impact sensor. The purpose of the airbag is to provide a vehicle occupant with soft cushioning and restraint during a collision. It can reduce injuries between the flailing occupant and the interior of the vehicle.

The shape of the airbag can be dependent on the shape of the vehicle. This is due to the fact that different vehicles have different interior configurations and occupant seating positions. Therefore, the airbag must be designed to fit the specific interior dimensions of each vehicle. For example, a larger vehicle may require a larger airbag, while a smaller vehicle may require a smaller airbag. The shape of the airbag is crucial in ensuring that it provides the necessary protection to the vehicle occupants during a collision. The airbag provides an energy-absorbing surface between the vehicle's occupants and a steering wheel, instrument panel, body pillar, headliner, and windshield, for example. Modern vehicles may contain up to ten airbag modules in various configurations, including driver, passenger, side-curtain, seat-mounted, door-mounted, B and C-pillar mounted side-impact, knee bolster, inflatable seat belt, and pedestrian airbag modules.

As noted above, vehicle platform architectures are becoming more unique, with some architectures having a higher longitudinal space between the driver and the windshield and a slimmer and smaller instrument panel than traditional vehicles. Due to this combination of a higher longitudinal space between the driver and windshield and a slim and smaller instrument panel, the necessary structural support for a passenger airbag is unavailable. Also, current airbags are deployed vertically and are designed to support/restrict the longitudinal movement of the occupant. However, this results in higher neck injury values and more chest deflection, both of which are crucial parameters for overall passenger safety and in obtaining 5-star safety rating performance.

A vertically deploying airbag needs a robust supporting location for the non-passenger contacting end of the airbag, which is not available in newer vehicle designs. Even if a vertically deploying airbag were used in newer vehicle platform architectures, bending of the airbag would occur, reducing the efficiency of its functionality. Furthermore, such vertically deploying airbags would have a higher volume above head level, causing the airbag to load the occupant in an undesired direction, leading to a deterioration of performance attributes. The shape and size of the regular front passenger front airbag (FPFAB) differs from other airbags, such as side, rear, seat, and driver front airbags. Several attempts have been made to enhance the efficiency of the current vertical deployment design. These include adding different shapes, increasing the amount of fabric over the airbag, and improving the friction between contact surfaces. Additionally, various restraint parameters have been modified, but results have been limited.

Embodiments of this disclosure provide for a horizontally inflating/deploying passenger front airbag and a corresponding deployment system. The horizontally deploying passenger front airbag of this disclosure has a unique shape and size for a FPFAB, as well as a high volume. The shape of the horizontally deploying passenger front airbag of this disclosure facilitates use of the available cabin area as a proper reaction surface in the intended longitudinal loading direction when using a smaller instrument panel. That is, the horizontally deploying passenger front airbag can operate effectively and efficiently even in the absence of a larger instrument panel.

FIG. 1 illustrates an example electric vehicle in accordance with this disclosure. The embodiment of the electric vehicle 100 illustrated in FIG. 1 is for illustration and explanation only. FIG. 1 does not limit the scope of this disclosure to any particular implementation of a vehicle. For example, the horizontally deploying passenger front airbag and corresponding deployment system described in this disclosure could be used in a wide range of vehicles, including electric vehicles, internal combustion engine vehicles, hybrid vehicles where part of the propulsion energy comes from an internal combustion engine and part from a battery, etc.

In the example illustrated in FIG. 1, the electric vehicle 100 may include a top hat structure coupled to an electric vehicle platform, where the platform of vehicle 100 includes a chassis (not visible in FIG. 1) supporting a body 101 for carrying the operator, passengers, and/or cargo. In some embodiments, the chassis of the vehicle 100 is in the form of a "skateboard" vehicle platform supporting the one or more energy storage elements (batteries) that provide input electrical power used by various components, such as one or more electric motors of the electric vehicle 100 and a control system of the electric vehicle 100. The top hat structure is designed and dimensioned to have at least a cabin configured to provide space for one or more persons to sit and either operate or ride in the electric vehicle.

The operator and/or passengers may enter and exit the cabin through at least one door forming part of the cabin. A separate structure may permit access to the storage, such as one or more sliding side door(s), a rear lift gate, a rear tailgate, or some combination of the same. A transparent windshield 104 and other transparent panels mounted within and forming part of the cabin allow at least one passenger (referred to as the "operator") to see outside the cabin. Rear-view mirrors mounted to sides of the cabin enable the operator to see objects to the sides and rear of the cabin and may include warning indicators (such as selectively illuminated warning lights) for features such as blind spot warning (indicating that another vehicle is in the operator's blind spot) and/or lane departure warning.

As noted above, vehicle platform architectures are becoming more unique. For example, the highly sloping design of the front portion of the electric vehicle 100, including a sloping or curved windshield 104, creates a higher longitudinal space between the driver and the windshield 104, in addition to more prevalent use of slimmer and smaller instrument panels than traditional vehicles. The horizontally deploying passenger front airbag of this disclosure allows for vehicles such as the electric vehicle 100 to effectively incorporate passenger front airbags despite these modern changes in vehicle design.

Although FIG. 1 illustrates one example of an electric vehicle 100, those skilled in the art will recognize that the full structure and operation of a suitable vehicle are not depicted in the drawings or described here. Instead, for simplicity and clarity, only so much of the structure and operation as is necessary for an understanding of this disclosure is depicted and described. Various changes may be made to the example of FIG. 1, and horizontally deploying passenger front airbags and associated systems as described in this disclosure may be used with any other suitable vehicle.

Figure 2:
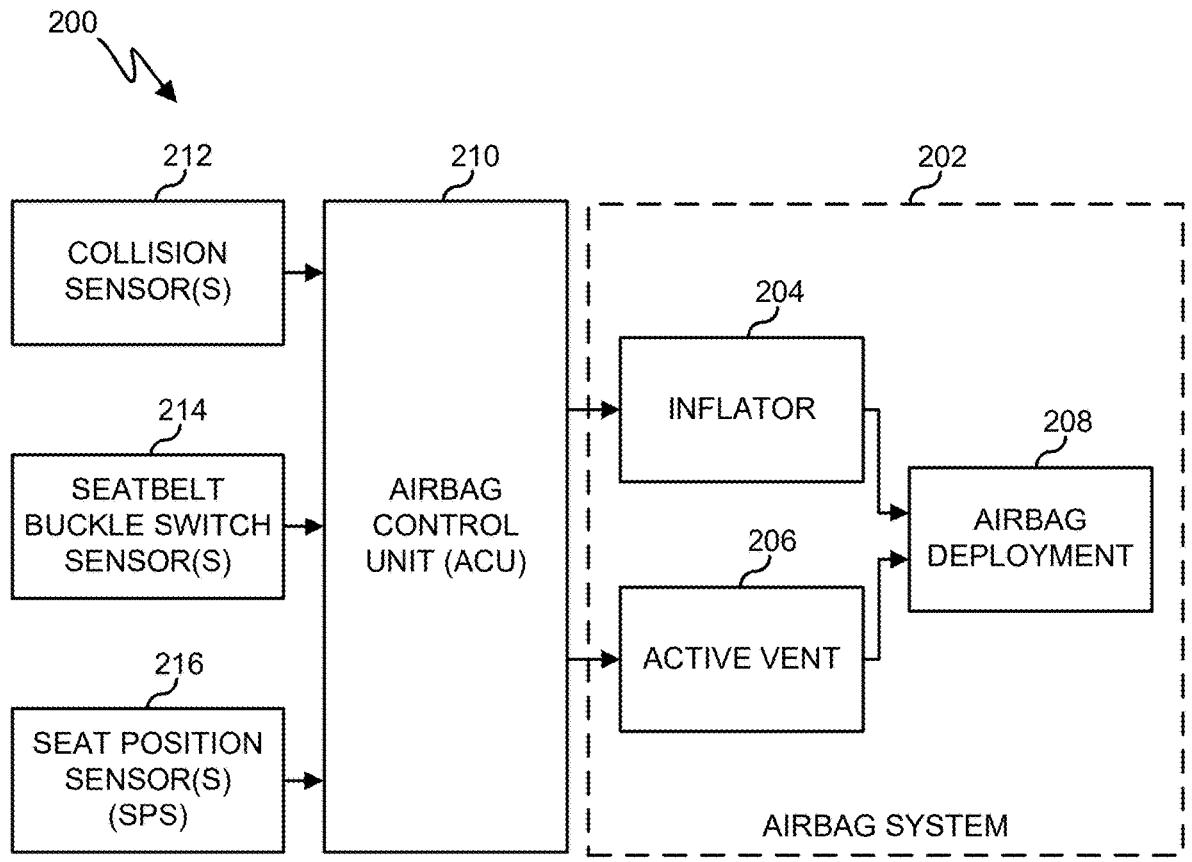
FIG. 2 illustrates an example airbag deployment system in accordance with this disclosure.

FIG. 2 illustrates an example airbag deployment system 200 in accordance with this disclosure. For ease of explanation, the system 200 may be described as being used with the electric vehicle 100 of FIG. 1. However, the system 200 may be used with any other suitable vehicle, and in conjunction with any other suitable system(s).

As shown in FIG. 2, the system 200 includes an airbag system 202 that has at least one inflator 204 and at least one discrete vent and any number of active vent(s) 206 that facilitate airbag deployment 208. The system 200 can store an airbag in an airbag storage chamber when in a deflated state. When the inflator 204 inflates the airbag during airbag deployment 208, the airbag can emerge from the airbag storage chamber and expand to fill a substantial portion of the airbag's volume. The system also includes an airbag control unit (ACU) 210 that receives signals from various passenger safety sensors, such as one or more collision sensors 212, one or more seatbelt buckle switch sensors 214, and/or one or more seat position sensors 216. The ACU 210 can include at least one processor, such as the processor 702 described below. As shown in FIG. 2, based on the signals provided by the various passenger safety sensors, the ACU 210 can cause the inflator 204 to activate and deploy an airbag, e.g., the airbag of airbag system 202.

In the event of a vehicular crash, the vehicle's crash sensors, such as the one or more collision sensors 212, the one or more seatbelt buckle switch sensors 214, and/or the one or more seat position sensors 216, provide crucial information to the ACU 210. For example, the sensors can provide information including collision type, angle, and severity of impact. Using this information, the airbag deployment system 200's ACU 210 can perform a crash algorithm to determine if the crash event meets the criteria for airbag deployment and, if so, trigger various firing circuits to deploy one or more airbag modules within the vehicle.

Working as a supplemental restraint system to the vehicle's seat-belt systems, airbag module deployments can be triggered through a pyrotechnic process. The inflator 204 can cause inflation of the airbag using various gaseous substances, such as an amount of argon, helium, nitrogen, or other gases, or a combination thereof. The active vent 206 can have an associated strap of a length that it is put under tension when the airbag is deployed, causing the active vent to be in a closed state. The strap of the active vent can be coupled to a release mechanism to allow for the vent to be opened and gas to be allowed to exit from the airbag.

The airbag system 202 can also include one or more discrete vents that can be in the form of vent holes in the fabric of the airbag. The vent holes allow for discharging of some of the gas introduced into the airbag to the outside. The vent hole(s) is located at a position where the vent hole is not blocked when the airbag protects an occupant. The vent holes can smoothly discharge gas, thereby improving the passenger protection performance by limiting impact strength to the passenger.

Although FIG. 2 illustrates one example of an airbag deployment system 200, various changes may be made to FIG. 2. For example, various components and functions in FIG. 2 may be combined, further subdivided, replicated, or rearranged according to particular needs. Also, one or more additional components and functions may be included if needed or desired. Additionally, although certain passenger safety sensors are shown in FIG. 2 as being in communication with the ACU 210, it will be understood that other sensors and devices could be included in the system 200.

Figure 3A:
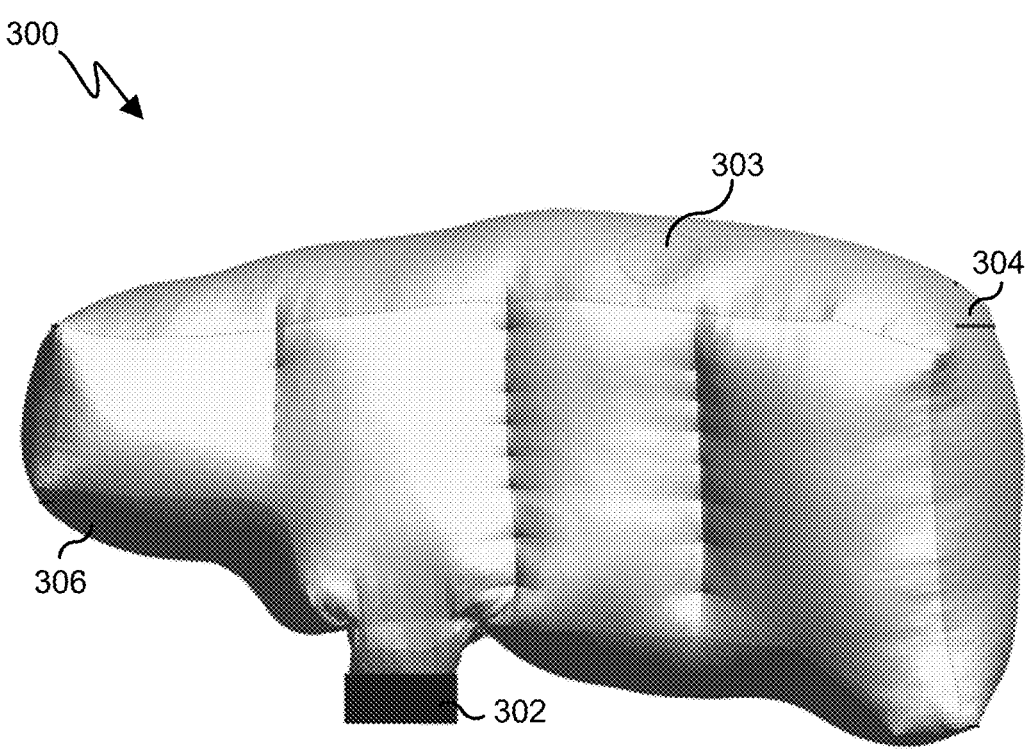
FIGS. 3A-3C illustrate various views of an example horizontally deploying passenger front airbag in accordance with this disclosure.
Figure 3B:
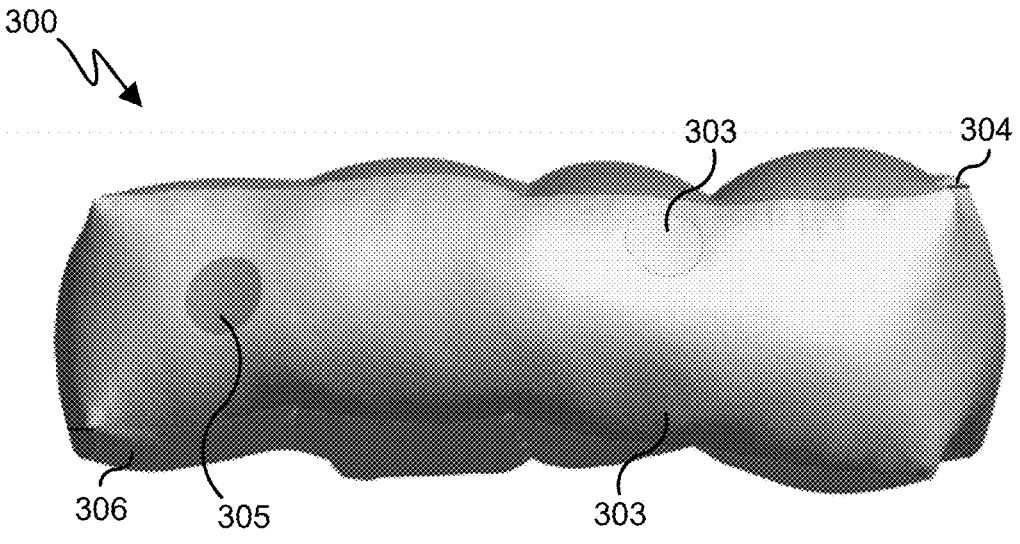
Figure 3C:
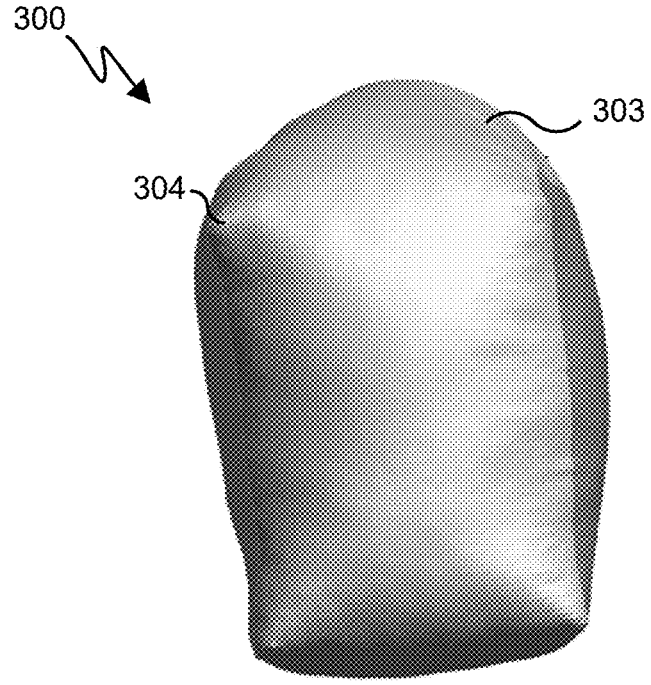

FIGS. 3A-3C illustrate various views of an example horizontally deploying passenger front airbag 300 in accordance with this disclosure. Particularly, FIG. 3A illustrates a side view of the horizontally deploying passenger front airbag 300 in accordance with this disclosure, FIG. 3B illustrates a top view of the horizontally deploying passenger front airbag 300 in accordance with this disclosure, and FIG. 3C illustrates a front view of the horizontally deploying passenger front airbag 300 in accordance with this disclosure. For ease of explanation, the horizontally deploying passenger front airbag 300 may be described as being used with the electric vehicle 100 of FIG. 1, and the airbag deployment system 200. However, the horizontally deploying passenger front airbag 300 may be used with any other suitable vehicle, and in with any other suitable system(s).

Effective and efficient airbags absorb occupant energy in the direction of their movement by loading the airbag for axial compressive loading. To address such issues, especially when the vehicle includes a higher longitudinal space between the driver and the windshield and a slimmer and smaller instrument panel, the horizontally deploying passenger front airbag 300 is a longitudinal airbag that can fit within a high-front space architecture of modern vehicle platforms, such as that of the electric vehicle 100. The horizontally deploying passenger front airbag 300 of this disclosure has a unique shape and size, as well as a high volume. The shape of the horizontally deploying passenger front airbag 300 facilitates available area as a proper reaction surface in the intended longitudinal loading direction when using a smaller instrument panel. That is, the horizontally deploying passenger front airbag can operate effectively and efficiently even in the absence of a larger instrument panel.

It is crucial to have a reaction surface that controls the deformation and stiffness of an airbag. By having this reaction surface, the safety measures can be adjusted in a way that ensures the airbag's stiffness is appropriate. Current airbag designs, e.g., vertically deploying airbags, lack this reaction surface in modern vehicle architectures. The horizontally deploying passenger front airbag 300, however, is designed with such identified reaction surfaces in mind, such that the shape of the horizontally deploying passenger front airbag 300 causes the horizontally deploying passenger front airbag 300 to be effectively and efficiently disposed between the occupant and the reaction surface when the horizontally deploying passenger front airbag 300 is deployed. Using a proper reaction surface ensures the horizontally deploying passenger front airbag 300 stiffness and other deployment parameters, allowing for ease in adjusting restraints to achieve desired results.

For example, creating a sturdy reaction surface for the airbag after deployment enables control over the stiffness properties through the manipulation of various parameters such as internal gas pressure, a discrete vent opening area, an active vent opening area, timing of opening the airbag, and volume of the airbag. Instability of the reaction surface makes it difficult to adjust these parameters, and thus the horizontally deploying passenger front airbag 300 provides a distinct advantage.

When creating an airbag shape, it is also important to consider any obstacles that could prevent the airbag from deploying properly. The horizontally deploying passenger front airbag 300 thus has a volume that matches or is lower than the existing front passenger airbags. This allows, in various embodiments, for the horizontally deploying passenger front airbag 300 to be used with existing inflators and passenger airbag deployment systems/modules with little to no modifications. The horizontally deploying passenger front airbag 300's shape thus takes into account all the factors mentioned above.

For example, as shown in FIGS. 3A-3C, the horizontally deploying passenger front airbag 300 is illustrated as deploying from a passenger front airbag module 302, such as the airbag system 202 described with respect to FIG. 2. That is, the horizontally deploying passenger front airbag 300 can be stored in an airbag storage chamber when in a deflated state. When an inflator inflates the airbag during airbag deployment 208, the horizontally deploying passenger front airbag 300 can emerge from airbag storage chamber and expand to fill a substantial portion of its volume. The horizontally deploying passenger front airbag 300 has a volume that extends upwards, as well as in a horizontal direction such that a front portion 304 of the horizontally deploying passenger front airbag 300 extends in a frontward direction, i.e., towards the occupant, and a rear portion 306 extends horizontally in a rearward direction, i.e., towards a vehicle windshield and to contact the vehicle windshield. In some embodiments, the volume of the horizontally deploying passenger front airbag 300 can be around 190 liters (although more or less is possible without departing from the scope of this disclosure), such that the horizontally deploying passenger front airbag is near, less than, or higher than the volume of existing vertically deploying front passenger airbags.

The horizontally deploying passenger front airbag 300 can include one or more active vents 303 disposed at one or more locations on the horizontally deploying passenger front airbag 300. The active vent 303 can have an associated strap of a length that it is put under tension when the airbag is deployed, causing the active vent to be in a closed state. The strap of the active vent can be coupled to a release mechanism to allow for the vent to be opened and gas to be allowed to exit from the airbag. The horizontally deploying passenger front airbag 300 can also include at least one discrete vent 305, which can be in the form of one or more vent holes in the fabric of the airbag. The discrete vent 305 allows for discharging of some of gas introduced into the airbag to the outside. The discrete vent 305 can smoothly discharge gas, thereby improving the passenger protection performance by limiting impact strength to the passenger. In various embodiments, the one or more active vents 303 and the one or more discrete vents 305 are located at positions where the vent holes are not blocked when the airbag is inflated. It will be understood that the vents 303, 305 can be formed at various locations of the airbag without departing from the scope of this disclosure.

Figure 3D:
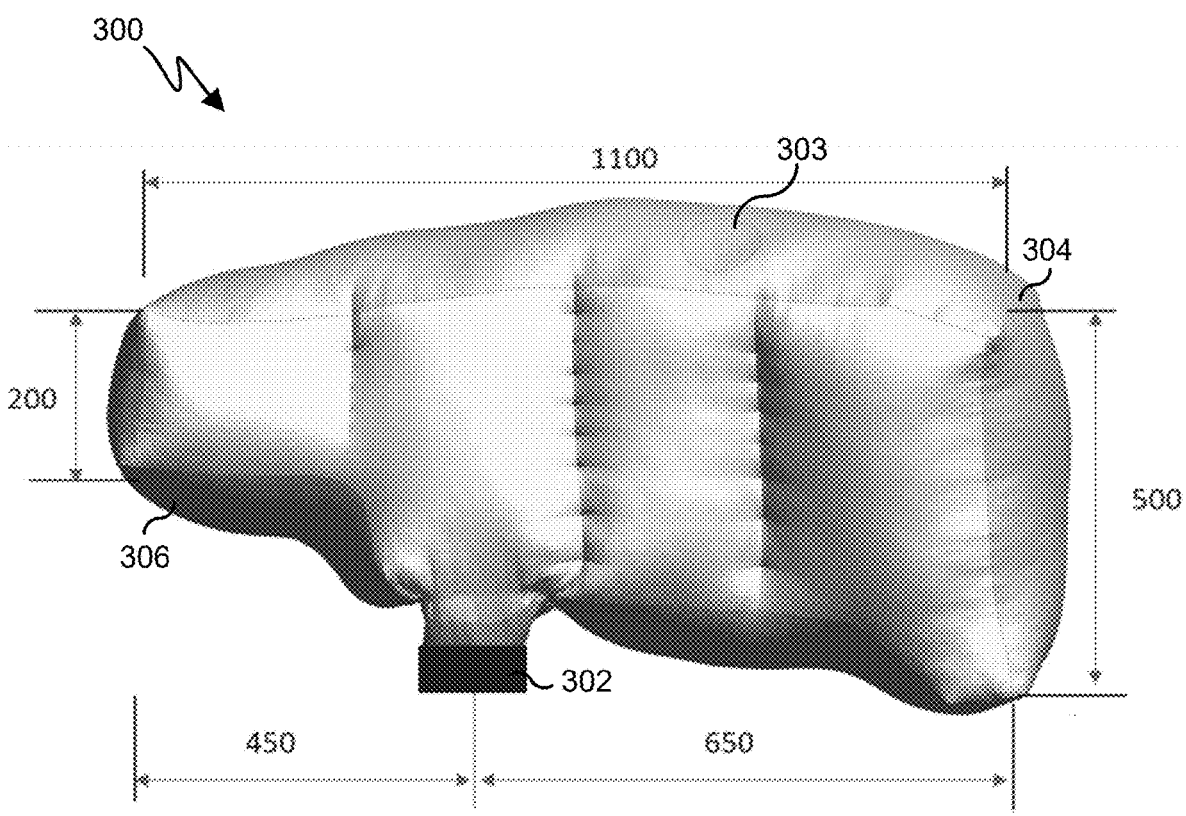
FIGS. 3D-3F illustrate various views of an example horizontally deploying passenger front airbag with example dimensions in accordance with this disclosure.
Figure 3E:
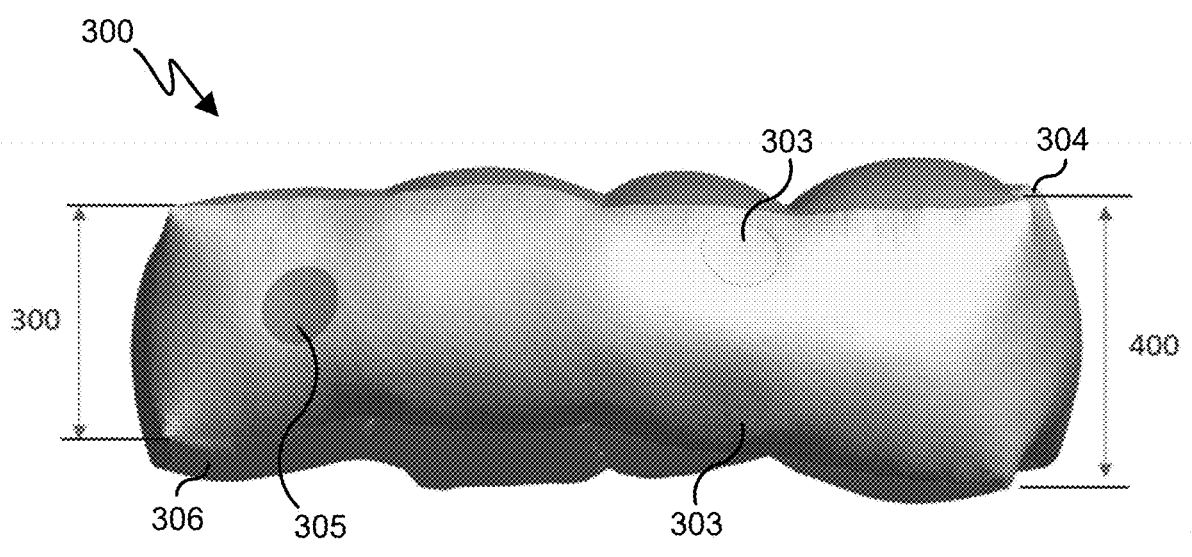
Figure 3F:
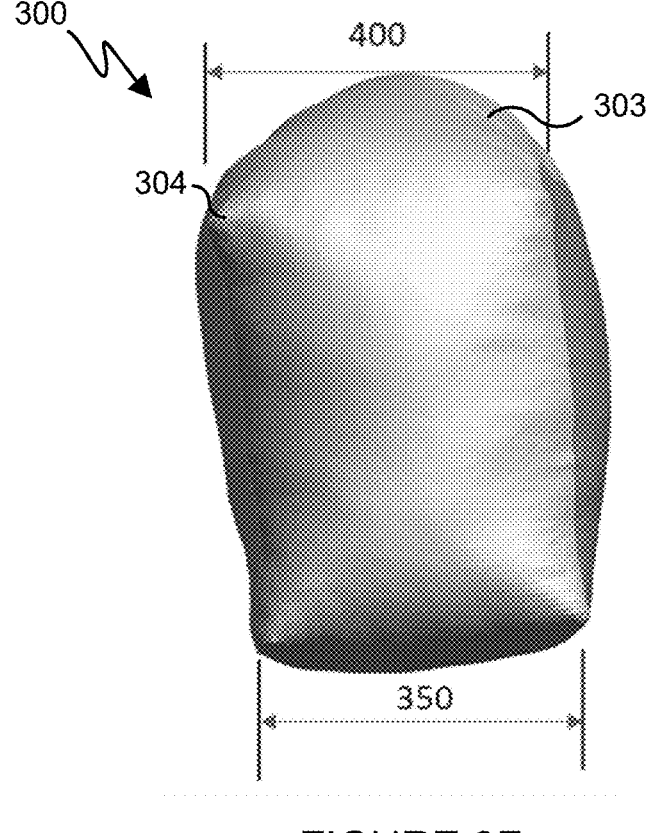

FIGS. 3D-3F illustrate various views of an example horizontally deploying passenger front airbag 300 with example dimensions in accordance with this disclosure. Particularly, FIG. 3D illustrates a side view of the horizontally deploying passenger front airbag 300 in accordance with this disclosure, FIG. 3E illustrates a top view of the horizontally deploying passenger front airbag 300 in accordance with this disclosure, and FIG. 3F illustrates a front view of the horizontally deploying passenger front airbag 300 in accordance with this disclosure. For ease of explanation, the horizontally deploying passenger front airbag 300 may be described as being used with the electric vehicle 100 of FIG. 1, and the airbag deployment system 200. However, the horizontally deploying passenger front airbag 300 may be used with any other suitable vehicle, and in with any other suitable system(s).

As shown in FIGS. 3D-3F, the shape of the horizontally deploying passenger front airbag 300 can be according to various measurements or dimensions. For example, as shown in FIG. 3D, a length of the horizontally deploying passenger front airbag 300 can be 1100 millimeters (mm) from the rear portion 306 to the front portion 304, and such that a portion of the horizontally deploying passenger front airbag 300 measured from the airbag module 302 to an end of the front portion 304 is 650 mm, and such that a portion of the horizontally deploying passenger front airbag 300 measured from the airbag module 302 to an end of the rear portion 306 is 450 mm. A height of the end of the front portion 304 can be 500 mm and a height of the end of the rear portion 306 can be 200 mm.

Further, for example as illustrated in FIG. 3E, a width of a top portion of the end of the front portion 304 can be 400 mm and a width of the end of the rear portion 306 can be 300 mm. Further, for example as illustrated in FIG. 3F, a width of a bottom portion of the end of the front portion 304 can be 350 mm. However, it will be understood that these measurements are for illustrative purposes to demonstrate how the horizontally deploying passenger front airbag 300 can be generally shaped for effective use in a particular environment, such as within the electric vehicle 100. It will be understood that the dimensions, shape, and volume of the horizontally deploying passenger front airbag 300 could be adjusted to ensure effective and efficient use of the horizontally deploying passenger front airbag 300 in various environments, such as if the vehicle has differing body, windshield, and/or passenger area dimensions.

Although FIGS. 3A-3C illustrate various views of one example of a horizontally deploying passenger front airbag 300, and FIGS. 3D-3F illustrate various views of an example horizontally deploying passenger front airbag 300 with example dimensions, various changes may be made to FIGS. 3A-3C and FIGS. 3D-3F. For example, as described above, the dimensions, shape, and volume of the horizontally deploying passenger front airbag 300 could be adjusted based on various factors such as the environment in which the horizontally deploying passenger front airbag 300 is to be used and deployed.

Figure 4A:
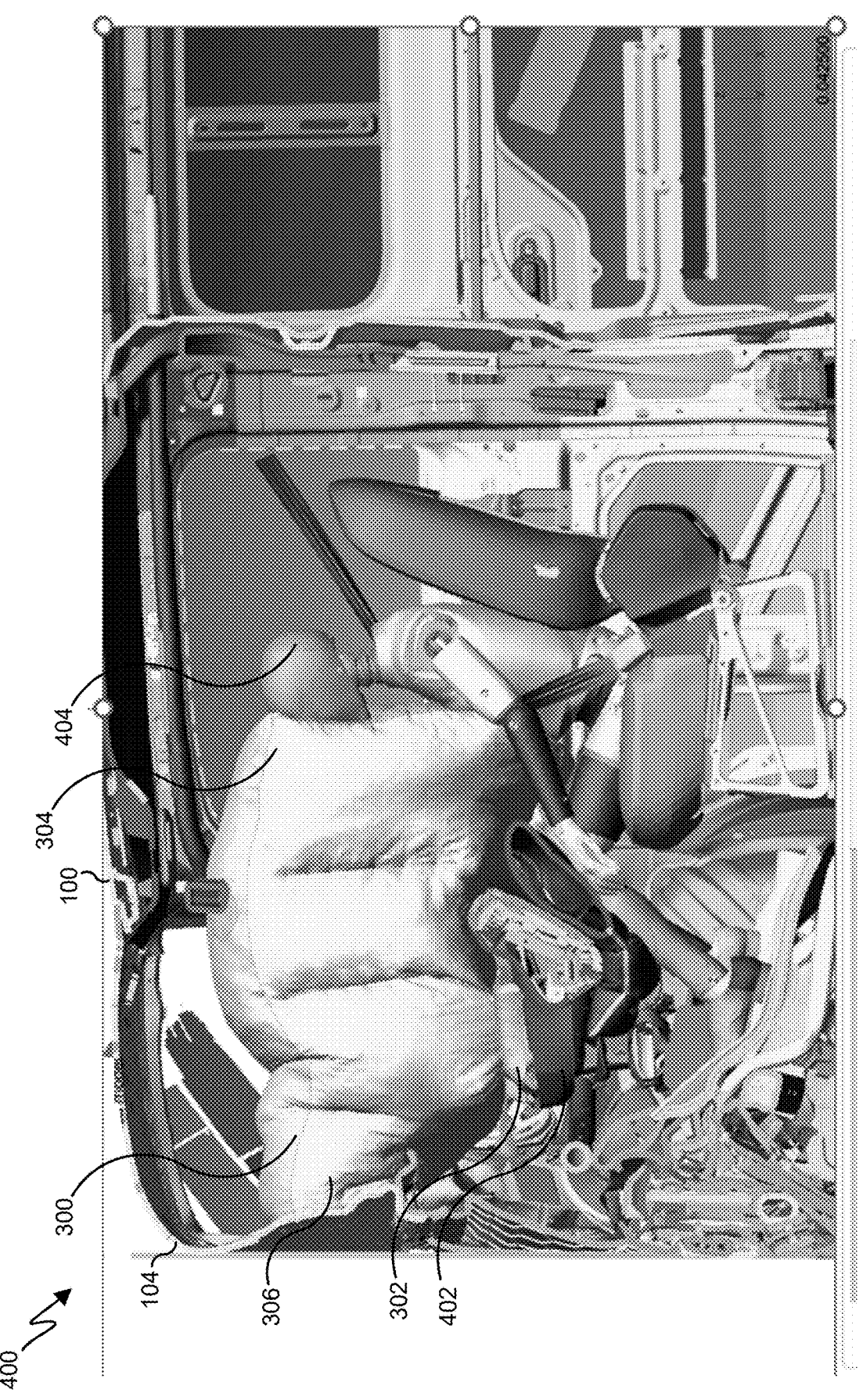
FIGS. 4A and 4B illustrate an example horizontal passenger airbag deployment event in accordance with this disclosure.
Figure 4B:
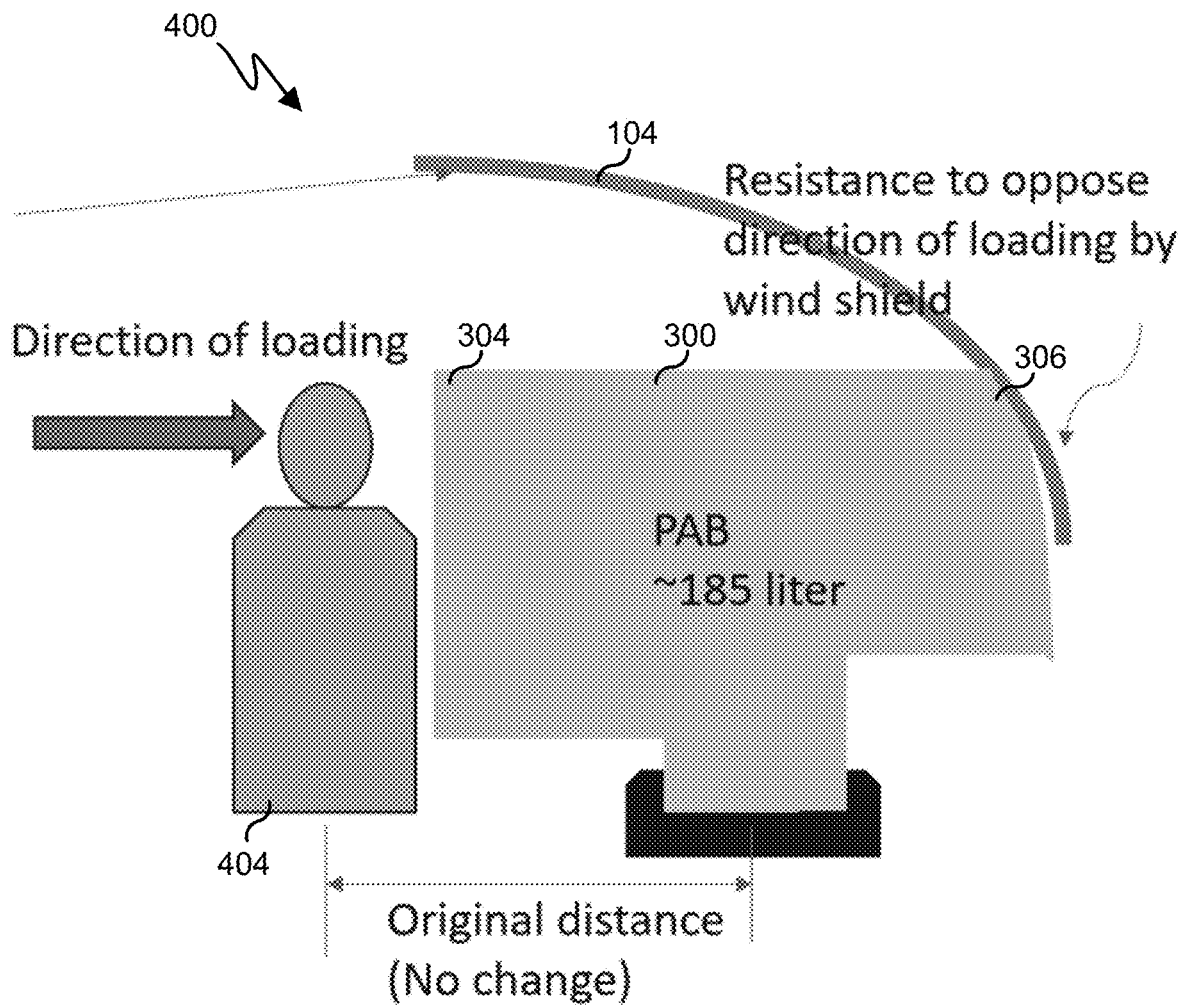

FIGS. 4A and 4B illustrate an example horizontal passenger airbag deployment event 400 in accordance with this disclosure. For ease of explanation, the horizontal passenger airbag deployment event 400 is described as occurring in the electric vehicle 100 of FIG. 1, and may be described as using the airbag deployment system 200. However, the horizontal passenger airbag deployment event 400 may occur with any other suitable vehicle having a horizontally deploying passenger front airbag, and in with any other suitable system(s).

As noted above, vehicle platform architectures are becoming more unique, such that vehicles like the electric vehicle 100 with a highly sloping design of the front portion of the vehicle being produced. As shown in FIG. 4A, the vehicle 100 includes a sloping or curved windshield 104, which creates a higher longitudinal space between the driver and the windshield 104. The vehicle 100 also includes an instrument panel 402 that is slimmer and smaller than instrument panels of traditional vehicles.

As shown in FIG. 4A, when a collision is detected and the airbag deployment system, such as the system 200 described with respect to FIG. 2, determines that the passenger front airbag should be deployed, the horizontal passenger airbag deployment event 400 occurs. As further shown in FIG. 4A, when the horizontally deploying passenger front airbag 300 is deployed from the passenger front airbag module 302 (compactly installed within the instrument panel 402), the horizontally deploying passenger front airbag 300 inflates upward above the instrument panel 402 and extends between a front passenger 404 and the windshield 104 in a generally horizontal direction. For example, as shown in FIG. 4A, the front portion 304 of the horizontally deploying passenger front airbag 300 extends horizontally out over the instrument panel 402 towards an interior of the cabin and the front passenger 404 to meet the front passenger 404 and cushion the front passenger 404. At substantially the same time, the rear portion 306 of the horizontally deploying passenger front airbag 300 extends in a generally horizontal direction towards the windshield 104 to meet/contact the windshield 104.

As described in this disclosure, it is crucial to have a reaction surface that controls the deformation and stiffness of an airbag. As shown in FIG. 4A, the curved windshield 104 serves as the reaction surface when the rear portion 306 of the horizontally deploying passenger front airbag 300 is pressed against the windshield 104 during the horizontal passenger airbag deployment event 400. By having this reaction surface, the safety measures can be adjusted in a way that ensures the airbag's stiffness is appropriate.

Figure 5:
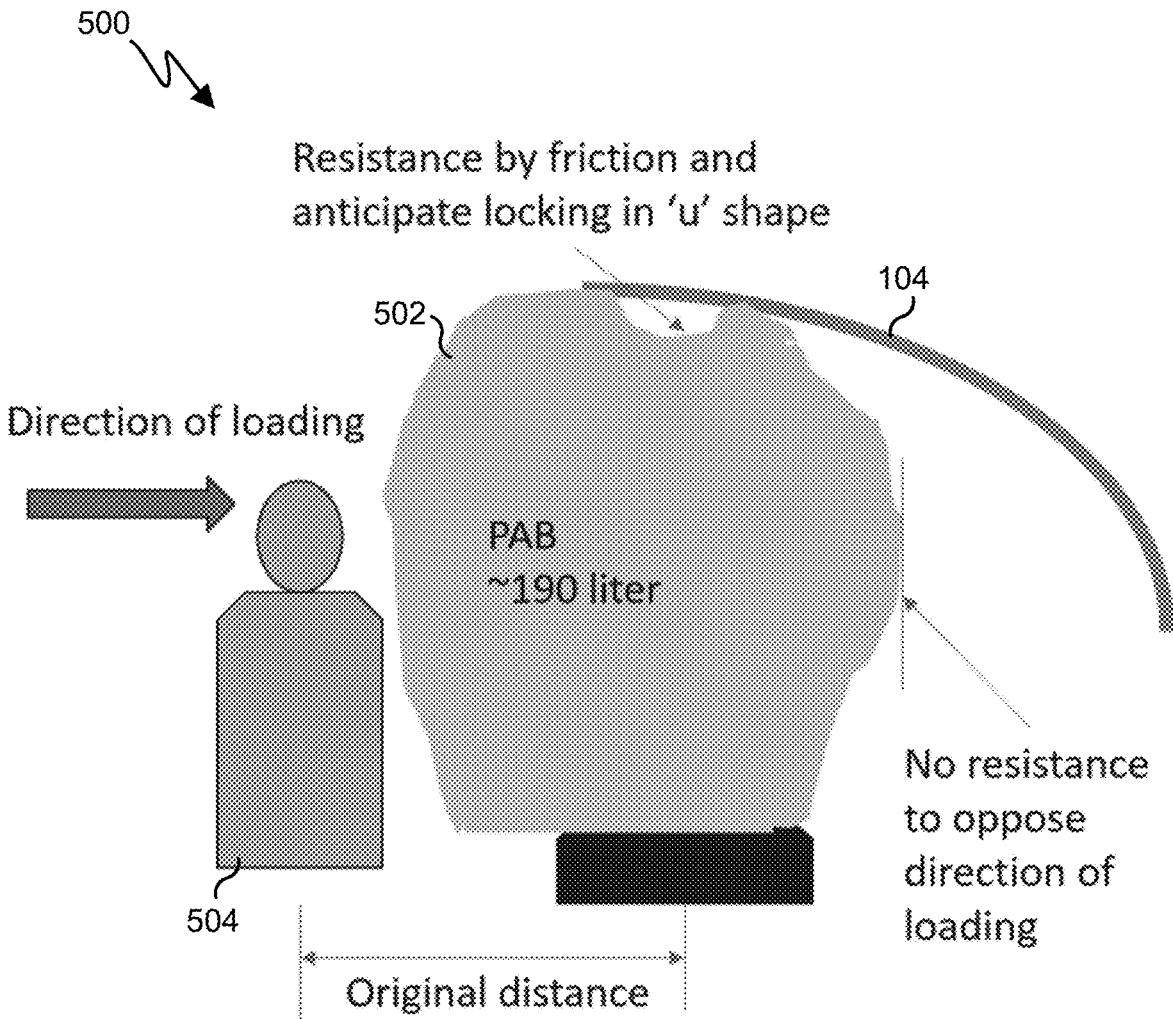
FIG. 5 illustrates an example vertical airbag deployment event using a vertically deploying front passenger airbag.

Current airbag designs, e.g., vertically deploying airbags, lack this reaction surface in modern vehicle architectures. Current airbag designs were made to use a larger instrument panel as a reaction surface, but smaller instrument panels cannot function as a reaction surface. For example, FIG. 5 illustrates an example vertical airbag deployment event 500 using a vertically deploying front passenger airbag 502. As shown in FIG. 5, during the vertical airbag deployment event 500, the vertically deploying front passenger airbag 502 inflates upwards, such that the vertically deploying front passenger airbag 502 meets a top portion of the windshield 104. However, as shown in FIG. 5, such vertically deploying airbags have a higher volume above a head level of a front passenger 504, causing the airbag to load the front passenger 504 in an undesired direction such that there is no resistance to oppose the direction of loading. As shown in FIG. 5. some resistance by friction in which the top of the vertically deploying front passenger airbag 502 is deformed into a 'U' shape against a top of the windshield 104 can occur, but this provides limited benefit since there is no resistance opposite the direction of loading, and thus the movement of the occupant is not adequately stopped. This lack of resistance thus does not effectively cushion the front passenger 504, which can lead to a higher likelihood of injury. Bending of the vertically deploying front passenger airbag 502 can also occur, reducing the efficiency of its functionality.

As shown for example in FIG. 4B, however, the horizontally deploying passenger front airbag 300 is designed with such identified reaction surfaces in mind, such that the shape of the horizontally deploying passenger front airbag 300 causes the horizontally deploying passenger front airbag 300 to be effectively and efficiently disposed between the occupant and the reaction surface when the horizontally deploying passenger front airbag 300 is deployed. As shown in FIG. 4B, the horizontally deploying passenger front airbag 300 extends horizontally such that the rear portion 306 is pressed against the windshield 104 in a horizontal direction relative to the direction of loading of the front passenger 404, such that the windshield 104 provides resistance that opposes the direction of loading. Using a proper reaction surface ensures airbag stiffness and other deployment parameters, allowing for ease in adjusting restraints to achieve desired results, and provides for effective cushioning of the front passenger 404 to reduce the likelihood of injury.

Additionally, smaller instrument panels such as that shown in FIG. 4A can still be used with the horizontally deploying airbags of this disclosure, as there is no longer a need to use the instrument panel as a reaction surface with the horizontally deploying airbags of this disclosure. Further, although the volume of the vertically deploying front passenger airbag 502 shown in FIG. 5 and the volume of the horizontally deploying front passenger airbag 300 shown in FIGS. 4A and 4B can be similar, in general, embodiment of the horizontally deploying front passenger airbags of this disclosure can allow for the airbag to have a much lower volume than vertically deploying front passenger airbags. This is because, since the only support surface for a vertically deploying front passenger airbags in modern vehicle designs may be the top of the vehicle cabin or the top of the windshield as shown in FIG. 5, the volume needed to be high enough to reach the top of the vehicle cabin or the top of the windshield.

Depending on vehicle dimensions, however, the horizontally deploying front passenger airbags of this disclosure can be of much lower volume and still reach the horizontal reaction surface opposite the occupant direction of loading. In addition to leading to less material costs since the horizontally deploying airbag with a reduced volume in such embodiments would not require as much fabric to produce, having a lower volume can also reduce other system complexities. For example, in some cases, two inflators, such as the at least one inflator 204, would be used to ensure larger airbags with a higher volume are filled sufficiently. However, horizontally deploying front passenger airbags of this disclosure having a lower volume can allow for a single inflator to be used.

Example virtual test (simulation) results between an existing vertically deploying passenger front airbag and the horizontally deploying passenger front airbag 300 are shown in Table 1.

TABLE 1

| Example virtual test (simulation) Results Passenger Performance Percentage Improvement (Like to like comparison with replacing airbag) | | |
|---|---|---|
| Hybrid III 5th | Existing PAB | New PAB (with Improved Structure) |
| Head Injury Criterion (HIC15) | 100% | 114% |
| Neck Index | 100% | 149% |

13

TABLE 1-continued

Example virtual test (simulation) Results
Passenger Performance Percentage Improvement
(Like to like comparison with replacing airbag)

| Hybrid III 5th | Existing PAB | New PAB (with Improved Structure) |
|---|---|---|
| Neck Tension Force | 100% | 125% |
| Neck Compression Force | 100% | 121% |
| Chest Deflection | 100% | 122% |
| Chest Acceleration | 100% | 125% |
| Left Femur Force | 100% | 101% |
| Right femur Force | 100% | 86% |
| Simulated Star rating | Above 3.5 | Above 4.5 |
| Airbag volume | 100% | 97% |

As shown in Table 1, for modern vehicles having the design features described herein, using a horizontally deploying passenger front airbag such as the horizontally deploying passenger front airbag 300 results in a significantly higher safety rating than existing passenger airbags such as a vertically deploying passenger front airbag.

Although FIGS. 4A and 4B illustrate one example horizontal passenger airbag deployment event 400, various changes may be made to FIGS. 4A and 4B. For example, as described above, the dimensions, shape, and volume of the horizontally deploying passenger front airbag 300 could be adjusted based on the environment in which the horizontally deploying passenger front airbag 300 is to be used and deployed. Relatedly, the vehicle 100 can have different characteristics, and a horizontally deploying passenger front airbag 300 could be used in such a different vehicle without departing from the scope of this disclosure.

Although FIG. 5 illustrates one example of a vertical airbag deployment event 500, various changes may be made to FIG. 5. Vertically deploying airbags of other shapes and sizes could be used, although such other vertically deploying airbags would encounter similar issues to those described above.

Figure 6:
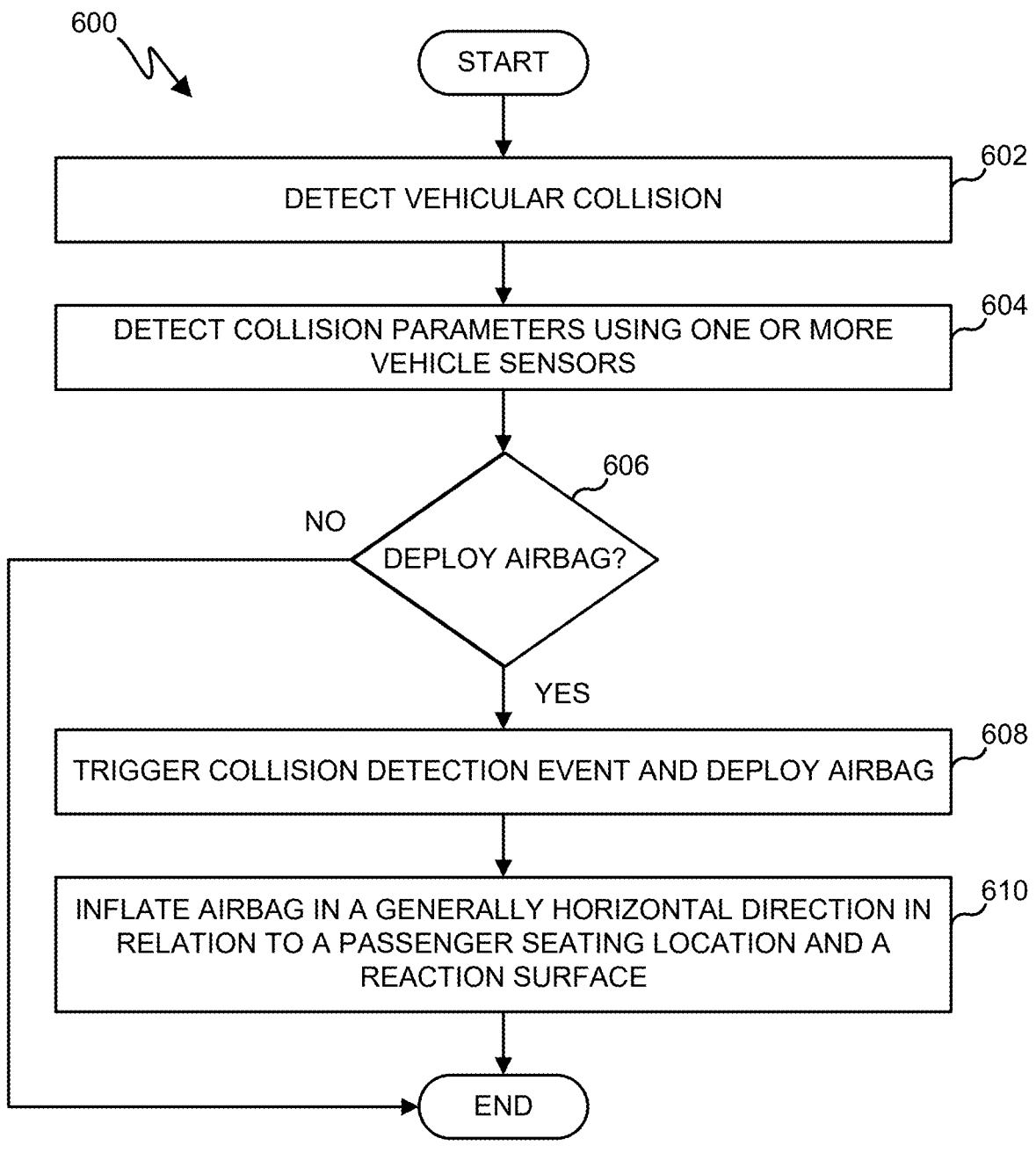
FIG. 6 illustrates an example method for deployment of a horizontally deploying passenger front airbag in accordance with this disclosure.

FIG. 6 illustrates an example method 600 for deployment of a horizontally deploying passenger front airbag in accordance with this disclosure. For ease of explanation, the method 600 may be described as occurring in the electric vehicle 100 of FIG. 1, and may be described as using the airbag deployment system 200. However, the method 600 may occur with any other suitable vehicle having a horizontally deploying passenger front airbag, and in with any other suitable system(s).

At step 602, the vehicle 100, such as via a vehicular airbag deployment system, detects a vehicular collision with one or more objects such as one or more other vehicles. In response to detecting the vehicular collision, at step 604, the vehicle 100 detects collision parameters using one or more vehicle sensors, such as the sensors, 212, 214, 216 described with respect to FIG. 2 that affect whether the vehicular airbag deployment system determines to deploy the airbag. For example, the one or more sensors can be configured to detect safety parameters of the vehicle, and the vehicular airbag deployment system can include an airbag control unit configured to identify the collision detection event using the detected safety parameters provided by the one or more sensors and trigger inflation and deployment of the airbag in response to the identification of the collision detection event.

At step 606, the vehicular airbag deployment system determines whether to deploy the horizontally inflating/deploying passenger front airbag. If not, the method 600 ends. If so, at step 608, the vehicular airbag deployment system triggers a collision detection event and initiates deployment of the horizontally inflating/deploying passenger front airbag. This can include that the horizontally inflating/deploying passenger front airbag is configured to be stored within an airbag storage chamber (such as the passenger front airbag module 302 or the airbag system 202) when the airbag is in a deflated state, where the airbag storage chamber is disposed at a location within a vehicle, such as in the instrument panel.

At step 610, the airbag is inflated in a generally horizontal direction in relation to a passenger seating location and a reaction surface. For example, the airbag can be further configured to be inflated in response to the collision detection event and deployed from the airbag storage chamber, and where, in an inflated state, the airbag extends in a generally horizontal direction between a passenger seating location and a reaction surface at a front interior surface of the vehicle and where the airbag contacts the reaction surface in the inflated state. In some embodiments, the airbag storage chamber is installed within an instrument panel of the vehicle. In some embodiments, the airbag is configured to deploy from the airbag storage chamber in response to the collision detection event initially vertically from the instrument panel and inflate in the generally horizontal direction over the instrument panel.

As described in this disclosure, the contact of the airbag and the reaction surface creates a resistance opposite a direction of loading of a passenger against the airbag. As described herein the reaction surface can be a windshield of the vehicle. As also described herein, the airbag can include a front portion that, when the airbag is in the inflated state, extends to the passenger seating location and a rear portion that, when the airbag is in the inflated state, extends to and contacts the reaction surface. In some embodiments, the rear portion of the airbag has a height that is shorter than a height of the front portion of the airbag. In some embodiments, the height of the front portion of the airbag is configured to extend between a torso of a passenger and a head level of the passenger. The contact of the rear portion of the airbag and the reaction surface creates a resistance opposite a direction of loading of a passenger against the front portion of the airbag. In some embodiments, the length of the airbag relative to the generally horizontal direction also exceeds a width of the airbag. In some embodiments, when the airbag is in the inflated state, the airbag has a length relative to the generally horizontal direction that exceeds a height of the airbag. In some embodiments, a volume of the airbag is equal to, less than, or more than 190 liters. However, various dimensions of the horizontally deploying passenger front airbags of the embodiments of this disclosure are within the scope of this disclosure.

Although FIG. 6 illustrates one example of a method 600 for deployment of a horizontally deploying passenger front airbag, various changes may be made to FIG. 6. For example, while shown as a series of steps, various steps in FIG. 6 could overlap, occur in parallel, occur in a different order, or occur any number of times (including zero times).

Figure 7:
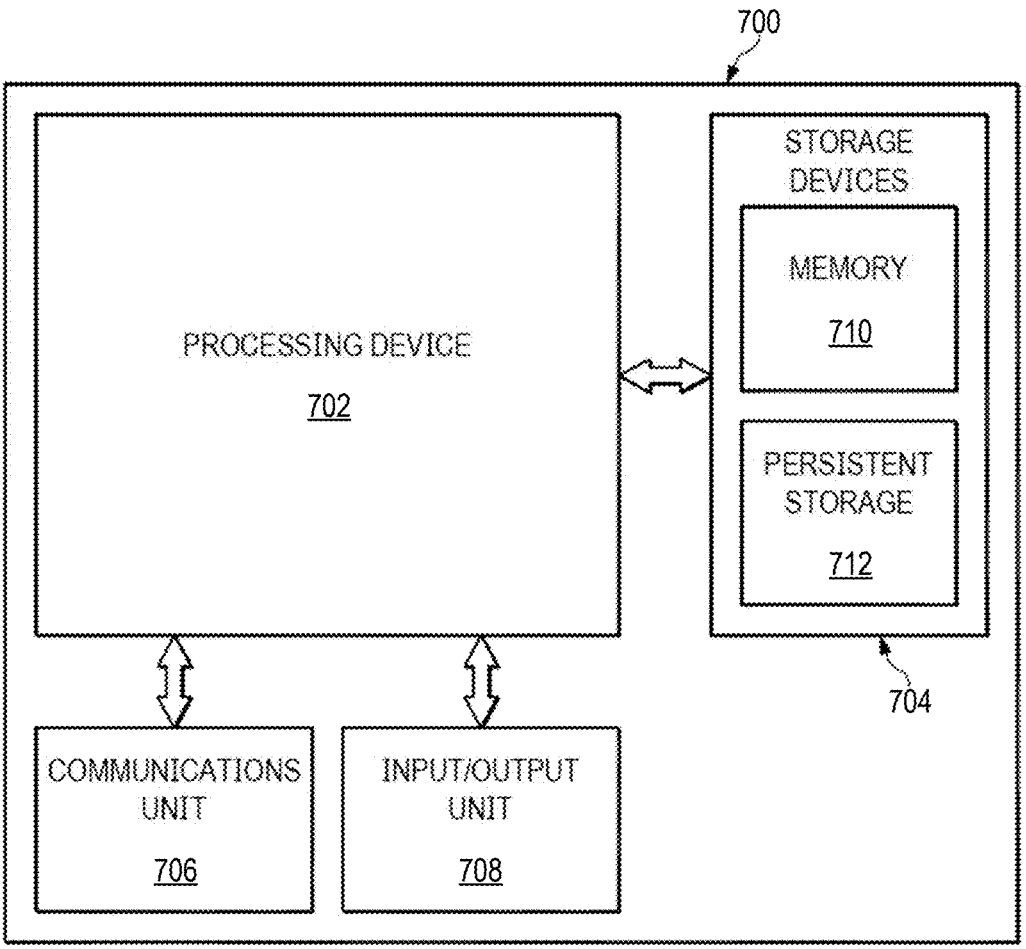
FIG. 7 illustrates an example device supporting execution of one or more functions in accordance with this disclosure.

FIG. 7 illustrates an example device 700 supporting execution of one or more functions described in this disclosure, such as triggering deployment of an airbag. In some embodiments, the device 700 can be at least a portion of the system 200. As shown in FIG. 7, the device 700 denotes a computing device or system that includes at least one processing device 702, at least one storage device 704, at least one communications unit 706, and at least one input/output (I/O) unit 708. The processing device 702 may execute instructions that can be loaded into a memory 710.

The processing device 702 includes any suitable number(s) and type(s) of processors or other processing devices in any suitable arrangement. Example types of processing devices 702 include one or more microprocessors, microcontrollers, DSPs, ASICs, FPGAs, or discrete circuitry. The processing device 702 can be the ACU 210 in some embodiments.

The memory 710 and a persistent storage 714 are examples of storage devices 704, which represent any structure(s) capable of storing and facilitating retrieval of information (such as data, program code, and/or other suitable information on a temporary or permanent basis). The memory 710 may represent a random access memory or any other suitable volatile or non-volatile storage device(s). The persistent storage 714 may contain one or more components or devices supporting longer-term storage of data, such as a read only memory, hard drive, Flash memory, etc.

The communications unit 706 supports communications with other systems or devices. For example, the communications unit 706 can include a network interface card or a wireless transceiver facilitating communications over a wired or wireless network. The communications unit 706 may support communications through any suitable physical or wireless communication link(s), such as supporting communications between the ACU 210 and the sensors 212, 214, 216. The I/O unit 708 allows for input and output of data. For example, the I/O unit 708 may provide a connection for user input such as via a touchscreen or other suitable input device. The I/O unit 708 may also send output to a display or other suitable output device. Note, however, that the I/O unit 708 may be omitted if the device 700 does not require local I/O.

Although FIG. 7 illustrates one example of a device 700 supporting execution of one or more tools to design hardware that implements one or more functions, various changes may be made to FIG. 7. For example, computing and communication devices and systems come in a wide variety of configurations, and FIG. 7 does not limit this disclosure to any particular computing or communication device or system.

Figure 8A:
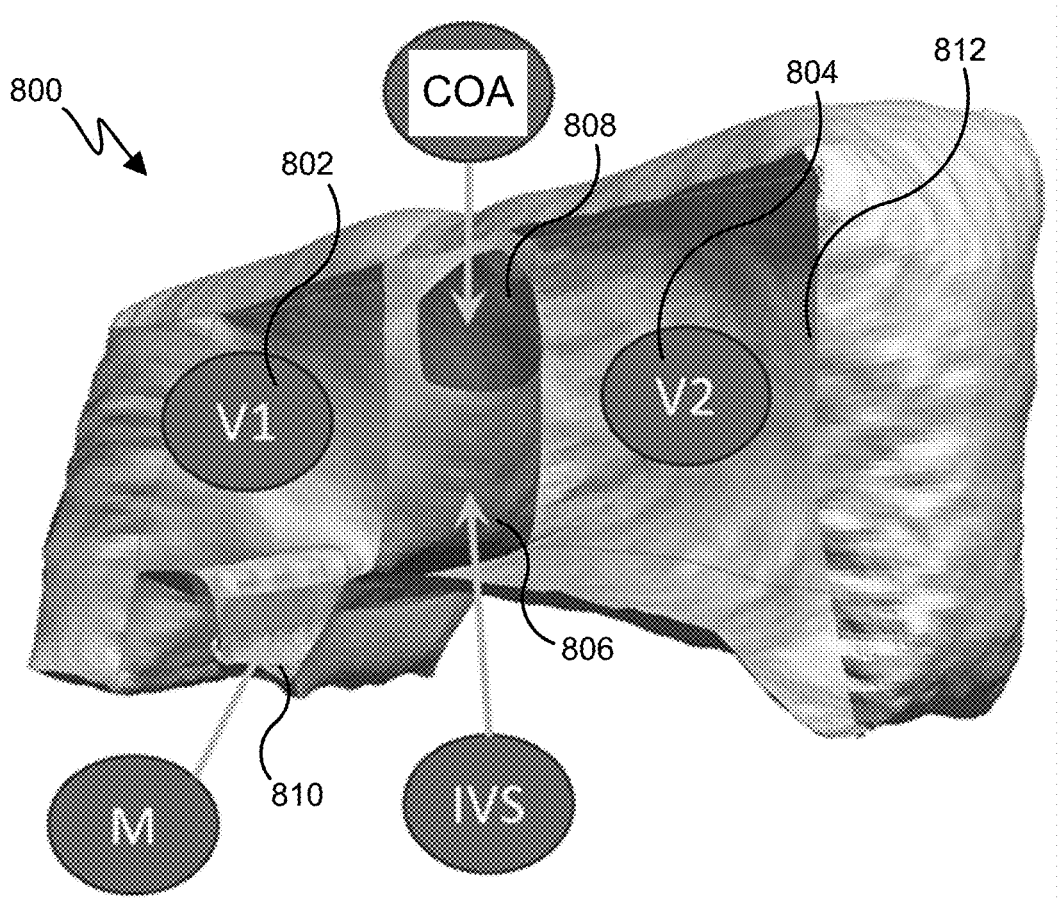
FIGS. 8A-8E illustrate various views of another example horizontally deploying passenger front airbag in accordance with this disclosure.
Figure 8B:
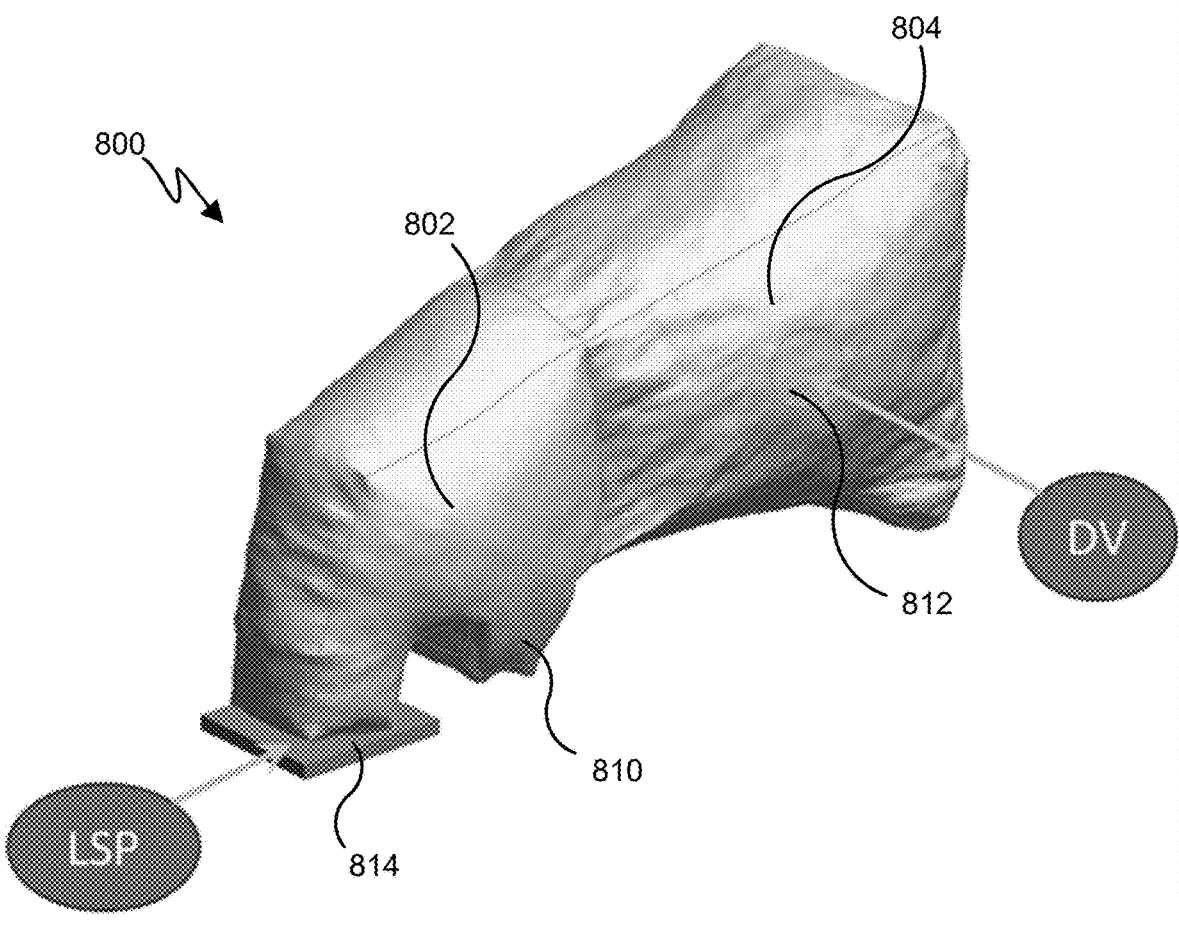
Figure 8C:
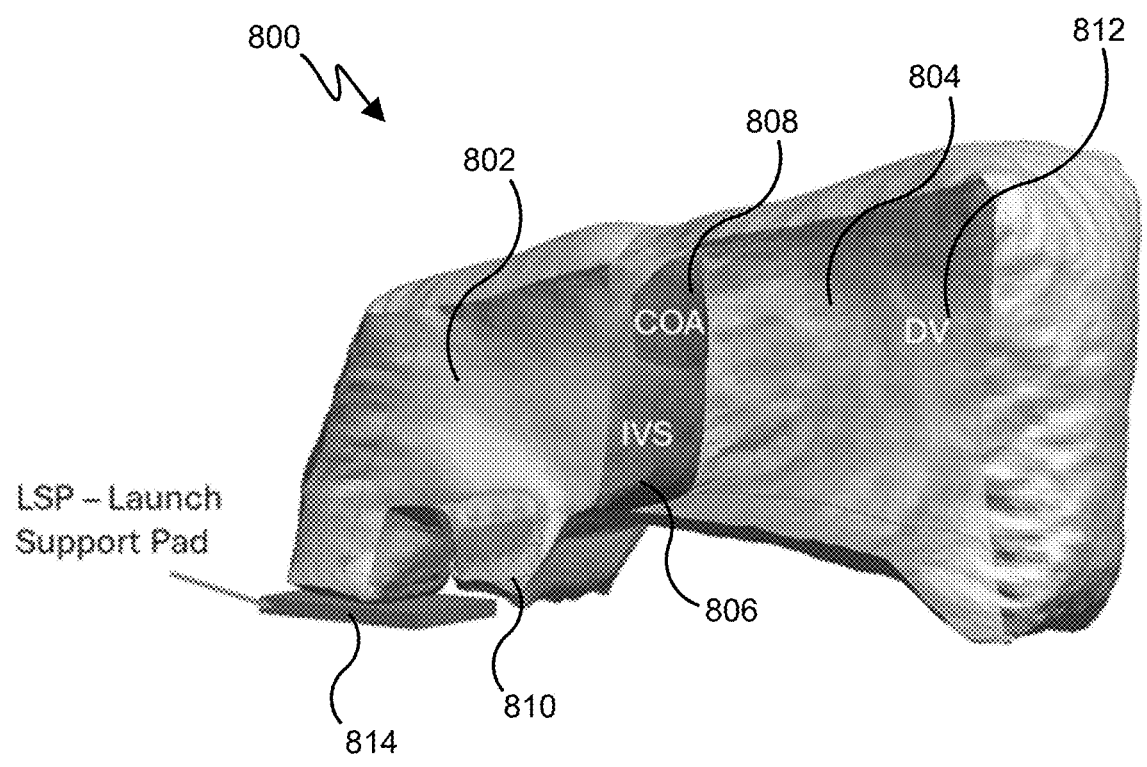
Figure 8D:
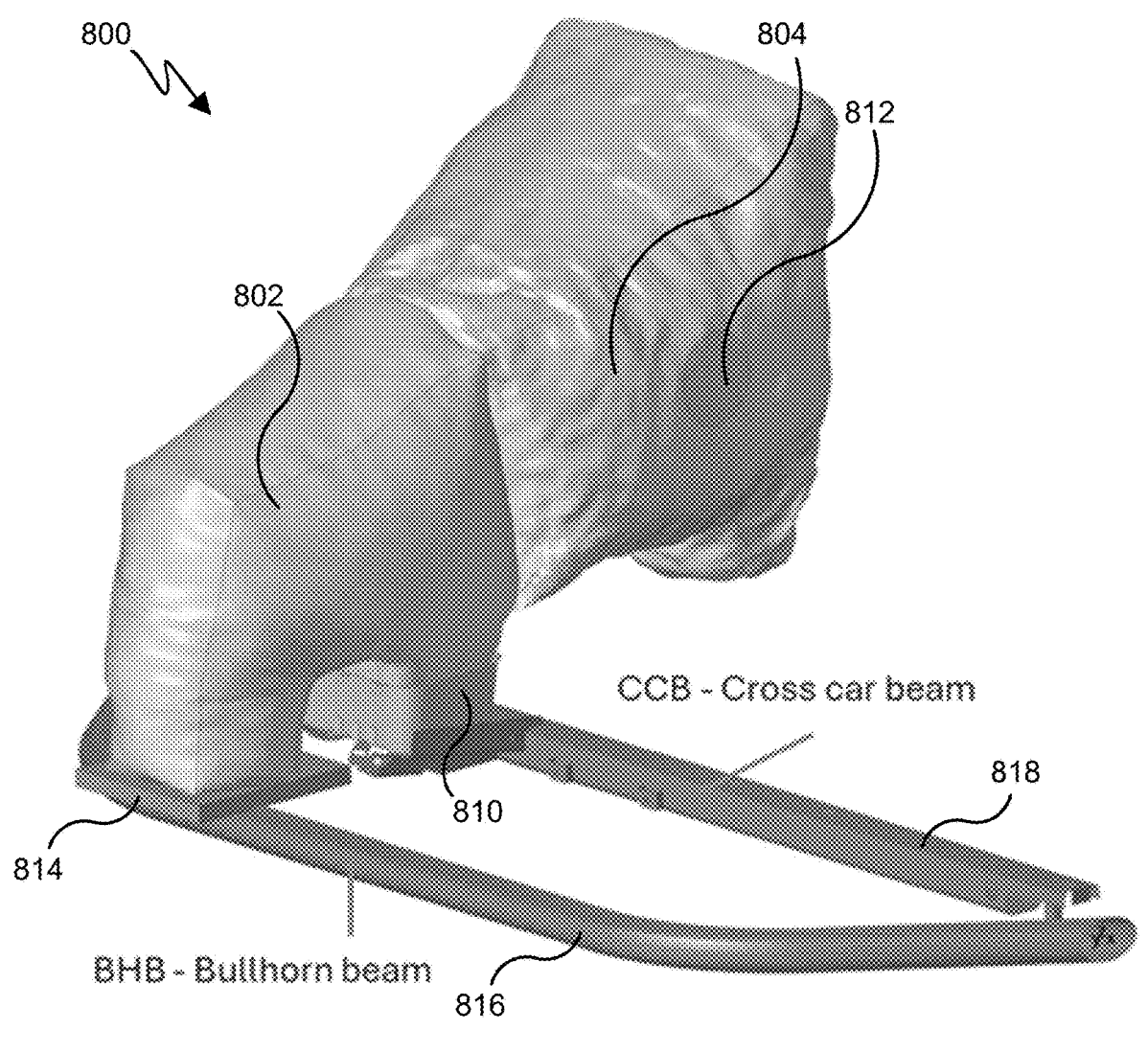
Figure 8E:
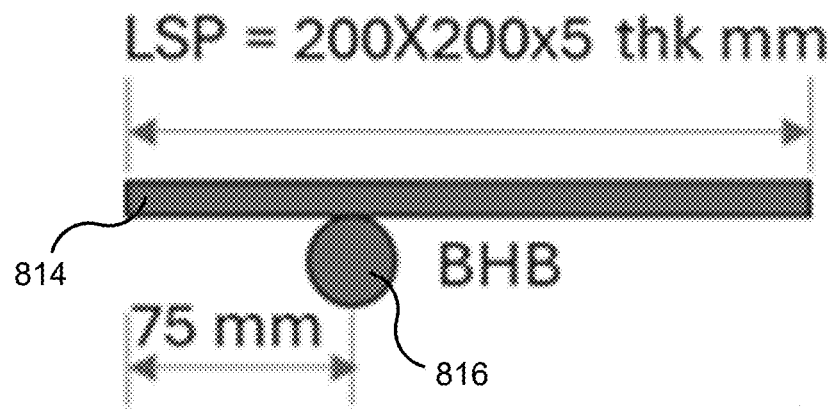

FIGS. 8A-8E illustrate various views of another example horizontally deploying passenger front airbag 800 in accordance with this disclosure. Particularly, FIG. 8A illustrates a side perspective view of the horizontally deploying passenger front airbag 800 in accordance with this disclosure, FIG. 8B illustrates a top perspective view of the horizontally deploying passenger front airbag 800 coupled to a support pad 814 in accordance with this disclosure, FIG. 8C illustrates a side perspective view of the horizontally deploying passenger front airbag 800 coupled to the support pad 814 in accordance with this disclosure, FIG. 8D illustrates a front perspective view of the horizontally deploying passenger front airbag 800 coupled to the support pad 814 and a beam structure in accordance with this disclosure, and FIG. 8E illustrates a side view of the support pad 814 coupled to the beam structure in accordance with this disclosure. For ease of explanation, the horizontally deploying passenger front airbag 800 may be described as being used with the electric vehicle 100 of FIG. 1, and the airbag deployment system 200. However, the horizontally deploying passenger front airbag 800 may be used with any other suitable vehicle, and in with any other suitable system(s).

Effective and efficient airbags absorb occupant energy in the direction of their movement by loading the airbag for axial compressive loading. Critical testing methods involved in the development of airbags include: (1) the static deployment of airbags; (2) airbag deployment on a sled environment; and (3) airbag deployment in a full vehicle environment. The horizontally deploying passenger front airbag 800 is a longitudinal airbag that can fit within a high-front space architecture of modern vehicle platforms, such as that of the electric vehicle 100. While the horizontally deploying passenger front airbag 300 described with respect to other embodiments of this disclosure can be useful in certain vehicle types, the airbag shape and deployment of the horizontally deploying passenger front airbag 800 is not dependent on the deformation of the vehicle structure. Rather than the deformed shape of the vehicle acting as support for airbag deployment, meaning different vehicles may require different airbag volumes depending on the way they deformed during testing, the horizontally deploying passenger front airbag 800 is vehicle-independent and can perform virtually identically to the horizontally deploying passenger front airbag 300 of this disclosure irrespective of the vehicle setup. This provides several benefits, including further reduction in airbag volume, elimination of costly systems like active vents, reduction in gas inflator capacity, and hence the total cost of the airbag. The shape of the horizontally deploying passenger front airbag 800 causes the horizontally deploying passenger front airbag 800 to be effectively and efficiently disposed between the occupant and a support structure when the horizontally deploying passenger front airbag 800 is deployed.

As shown in FIG. 8A, the horizontally deploying passenger front airbag 800 has a first volume 802 (V1) and a second volume 804 (V2). The horizontally deploying passenger front airbag 800 also includes an internal vertical separator (IVS) 806 with a controllable orifice area (COA) 808 for managing pressure difference in the first and second volumes 802, 804. This allows for the first volume 802 to be at a higher pressure than the second volume 804, such that the first volume 802 can provide strong structural support for the airbag 800, while the second volume 804 provides cushioning for a passenger. In some embodiments, the COA 808 can have a size of 24,000 mm$^2$, a diameter of 180 mm, and/or a dimension of 200 mm in width by 125 mm in height. However, it will be understood that various dimensions and sizes can be used for the COA 808 without departing from the scope of this disclosure.

In various embodiments, the type of fabric used for the IVS 806 is the same as the type of fabric used for the main body of the airbag 800. The horizontally deploying passenger front airbag 800 also includes an airbag container 810. In various embodiments, the horizontally deploying passenger front airbag 800 includes at least one discrete vent 812. In various embodiments, the horizontally deploying passenger front airbag 800 does not include any active vents.

As shown in FIGS. 8B and 8C, the horizontally deploying passenger front airbag 800 can be supported by a launch support pad (LSP) 814. The LSP 814 supports the first volume 802 vertically to facilitate proper deployment of the second volume 804 horizontally. The LSP 814 avoids having to use the deformed shape of the vehicle structure to as support for airbag deployment.

As shown in FIG. 8D, the horizontally deploying passenger front airbag 800 can be structurally supported by vehicular structural components including a bullhorn beam 816 and a cross car beam 818, but it will be understood that other structural vehicle components can be used without departing from the scope of this disclosure. For example, as shown in FIG. 8D, the LSP 814 can be coupled to (or formed integrally with) the bullhorn beam 816 and the airbag container 810 can be coupled to (or formed integrally with) the cross car beam 818. The bullhorn beam 816 and the cross car beam 818 are part of existing vehicle structures which support the steering column, control mounting bracket, etc., of a vehicle. As shown in FIG. 8E, the LSP 814 can be positioned on the bullhorn beam 816 at a position such that the bullhorn beam 816 is offset from a center of the LSP 814. The rear edge of LSP 814 is located at such a distance from bullhorn beam 816 that the rear edge will not have physical contact with the windshield 104 or parts surrounded by the windshield 104. Even if there is contact, then the rear edge of LSP 814 will have very minimal deformation. For example, as shown in the example of FIG. 8E, the bullhorn beam 816 is positioned about ⅓ (75 mm in this example) of the length of the LSP 814 from a rear portion of the LSP 814, and ⅔ (125 mm in this example) of the length of the LSP 814 from a front portion of the LSP 814, where the rear portion is positioned nearer to the windshield of the vehicle and the front portion is positioned nearer to the passenger. This offset from center of the LSP 814 allows for a proper spacing between the LSP 814 and the airbag container 810 so that the first volume 802 can be inflated fully. As shown in FIG. 8E, the dimensions of the LSP 814 can be 200× 200×5, but other dimensions can be used without departing from the scope of this disclosure.

As shown in FIGS. 8A-8E, the horizontally deploying passenger front airbag 800 is illustrated as deploying from the airbag container 810, e.g., a passenger front airbag module, such as the airbag system 202 described with respect to FIG. 2. That is, the horizontally deploying passenger front airbag 800 can have a portion comprising at least the first volume 802 and a portion comprising at least the second volume 804 stored in an airbag storage chamber when in a deflated state. When an inflator inflates the airbag during airbag deployment 208, the horizontally deploying passenger front airbag 800 can emerge from the airbag storage chamber and expand to fill a substantial portion of its first and second volumes 802, 804. The horizontally deploying passenger front airbag 800 has a total volume that extends upwards, as well as in a horizontal direction such that a front portion of the horizontally deploying passenger front airbag 800 comprising the second volume 804 extends in a frontward direction, i.e., towards the occupant. A rear portion comprising the first volume 802 inflates to contact the LSP 814 and extends vertically from the LSP 814 and the container 810.

In some embodiments, the volume of the horizontally deploying passenger front airbag 800 can be around 145 liters, which is 20% to 30% less than existing passenger air bag volumes (although more or less is possible without departing from the scope of this disclosure), such that the volume of the horizontally deploying passenger front airbag 800 is substantially less than the volume of existing vertically deploying front passenger airbags. In some embodiments, The at least one discrete vent 812 can be in the form of one or more vent holes in the fabric of the airbag. The discrete vent 812 allows for discharging of some of gas introduced into the airbag to the outside. The discrete vent 812 can smoothly discharge gas, thereby improving the passenger protection performance by limiting impact strength to the passenger. In various embodiments, the at least one discreet vent 812 is located at a position where the vent hole is not blocked when the airbag is inflated. It will be understood that the at least one discreet vent 812 can be formed at various locations of the airbag without departing from the scope of this disclosure. In various embodiments, at least one discrete vent 812 can be 7,850 mm² and have a diameter of 100 mm, but it will be understood that various dimensions of the discrete vent 812 can be used without departing from this disclosure.

Figure 8F:
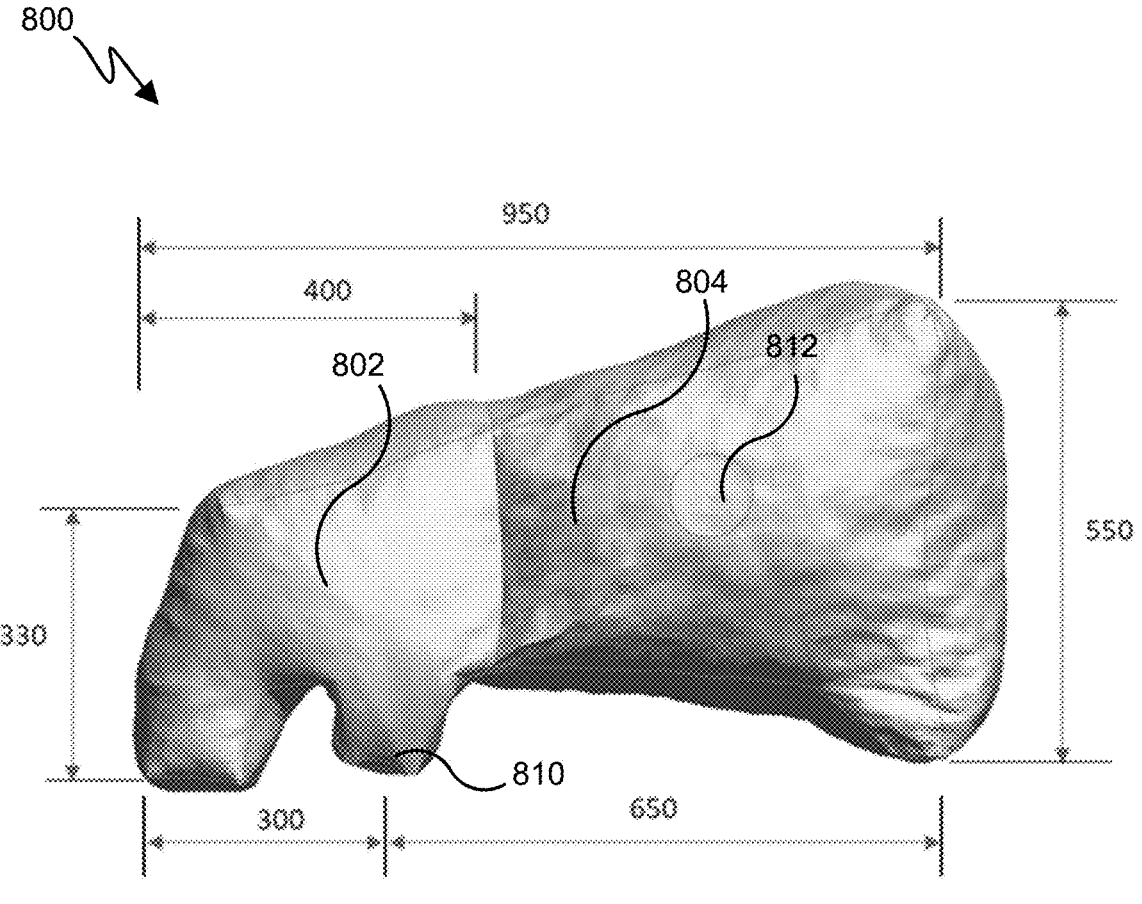
FIGS. 8F-8H illustrate various views of an example horizontally deploying passenger front airbag with example dimensions in accordance with this disclosure.
Figure 8G:
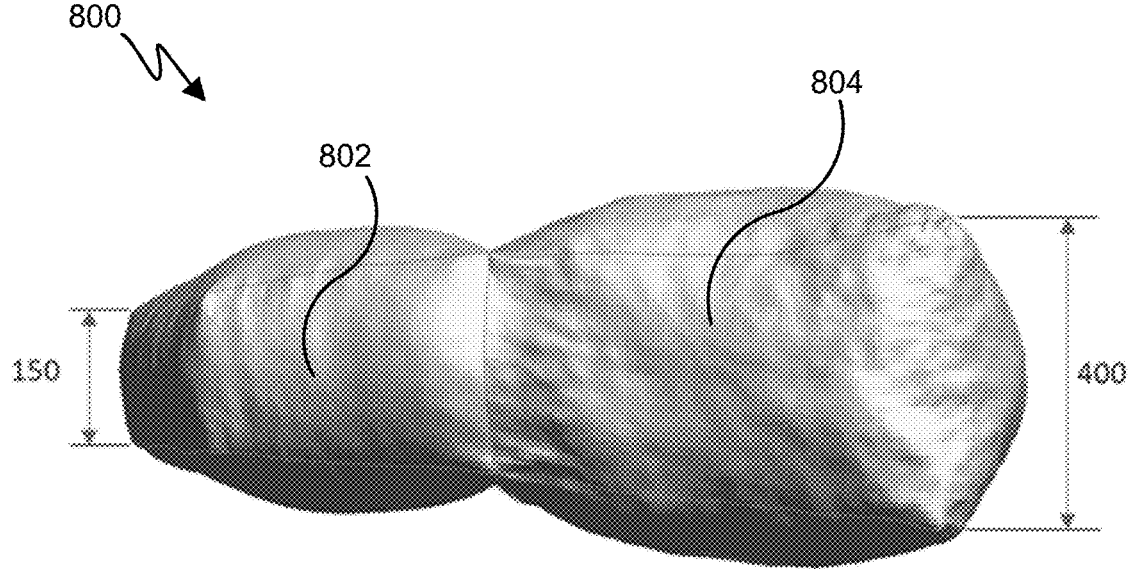
Figure 8H:
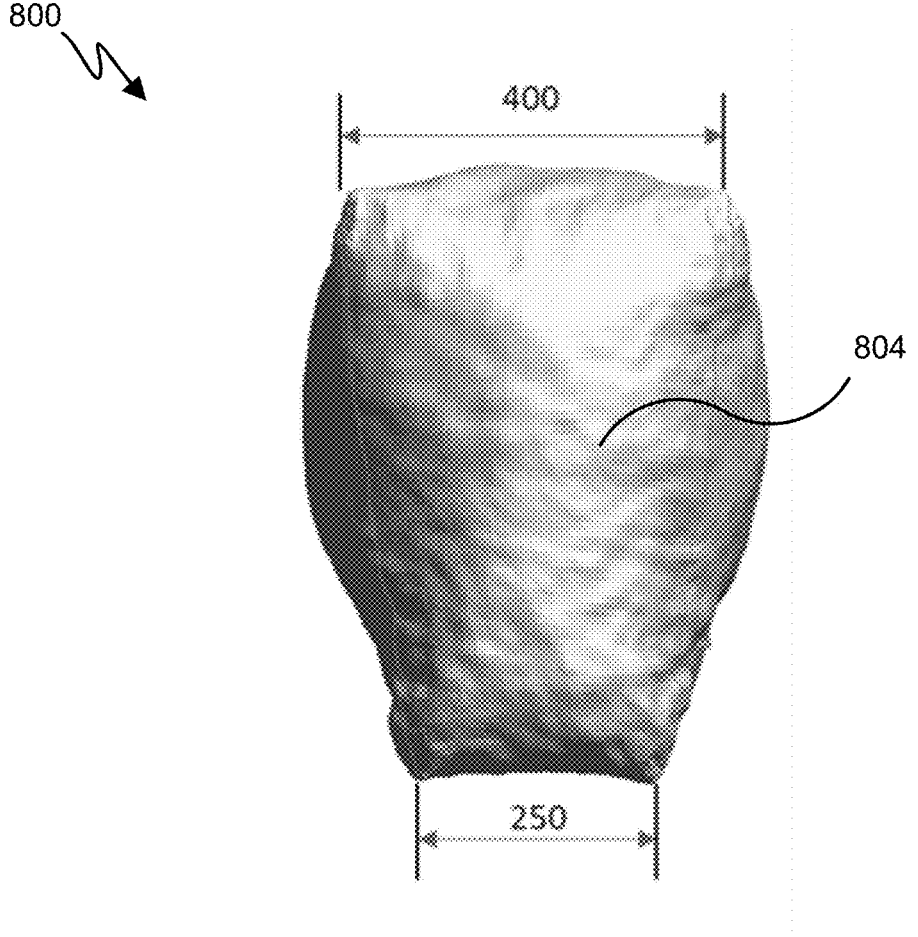

FIGS. 8F-8H illustrate various views of an example horizontally deploying passenger front airbag 800 with example dimensions in accordance with this disclosure. Particularly, FIG. 8F illustrates a side view of the horizontally deploying passenger front airbag 800 in accordance with this disclosure, FIG. 8G illustrates a top view of the horizontally deploying passenger front airbag 800 in accordance with this disclosure, and FIG. 8H illustrates a front view of the horizontally deploying passenger front airbag 800 in accordance with this disclosure. For ease of explanation, the horizontally deploying passenger front airbag 800 may be described as being used with the electric vehicle 100 of FIG. 1, and the airbag deployment system 200. However, the horizontally deploying passenger front airbag 800 may be used with any other suitable vehicle, and in with any other suitable system(s).

As shown in FIGS. 8F-8H, the shape of the horizontally deploying passenger front airbag 800 can be according to various measurements or dimensions. For example, as shown in FIG. 8F, a length of the horizontally deploying passenger front airbag 800 can be 950 millimeters (mm) from a rear portion comprising the first volume 802 to a front portion comprising the second volume 804, and such that a portion of the horizontally deploying passenger front airbag 800 measured from the airbag container 810 to an end of the front portion is 650 mm, and such that a portion of the horizontally deploying passenger front airbag 800 measured from the airbag container 810 to an end of the rear portion is 300 mm. A height of the end of the front portion can be 550 mm and a height of the end of the rear portion can be 330 mm. A length of the rear portion comprising the first volume 802 can be 400 mm.

Further, for example as illustrated in FIG. 8G, a width of a top portion of the end of the front portion comprising the second volume 804 can be 400 mm and a width of the end of the rear portion comprising the first volume 802 can be 150 mm. Further, for example as illustrated in FIG. 8H, a width of a bottom portion of the end of the front portion comprising the second volume 804 can be 250 mm. However, it will be understood that these measurements are for illustrative purposes to demonstrate how the horizontally deploying passenger front airbag 800 can be generally shaped for effective use in a particular environment, such as within the electric vehicle 100. It will be understood that the dimensions, shape, and volume of the horizontally deploying passenger front airbag 800 could be adjusted to ensure effective and efficient use of the horizontally deploying passenger front airbag 800 in various environments, such as if the vehicle has differing body and/or passenger area dimensions.

Although FIGS. 8A-8E illustrate various views of one example of a horizontally deploying passenger front airbag 800, and FIGS. 8F-8H illustrate various views of an example horizontally deploying passenger front airbag 800 with example dimensions, various changes may be made to FIGS. 8A-8E and FIGS. 8F-8H. For example, as described above, the dimensions, shape, and volume of the horizontally deploying passenger front airbag 800 could be adjusted based on various factors such as the environment in which the horizontally deploying passenger front airbag 800 is to be used and deployed.

Example virtual test (simulation) results between an existing vertically deploying passenger front airbag and the horizontally deploying passenger front airbag 800 are shown in Table 2.

TABLE 2

Example virtual test (simulation) Results
Passenger Performance Percentage Improvement
(Like to like comparison with replacing airbag)

| Hybrid III 5th | Existing PAB | New PAB (with Improved Structure) |
| --- | --- | --- |
| Head Injury Criterion (HIC15) | 100% | 111% |
| Neck Index | 100% | 165% |
| Neck Tension Force | 100% | 116% |
| Neck Compression Force | 100% | 137% |
| Chest Deflection | 100% | 115% |
| Chest Acceleration | 100% | 129% |
| Left Femur Force | 100% | 101% |
| Right femur Force | 100% | 88% |
| Simulated Star rating | Above 3.5 | Above 4.75 |
| Airbag volume | 100% | 76% |

As shown in Table 2, for modern vehicles having the design features described herein, using a horizontally deploying passenger front airbag such as the horizontally deploying passenger front airbag 800 results in a significantly higher safety rating than existing passenger airbags such as a vertically deploying passenger front airbag.

Figure 9:
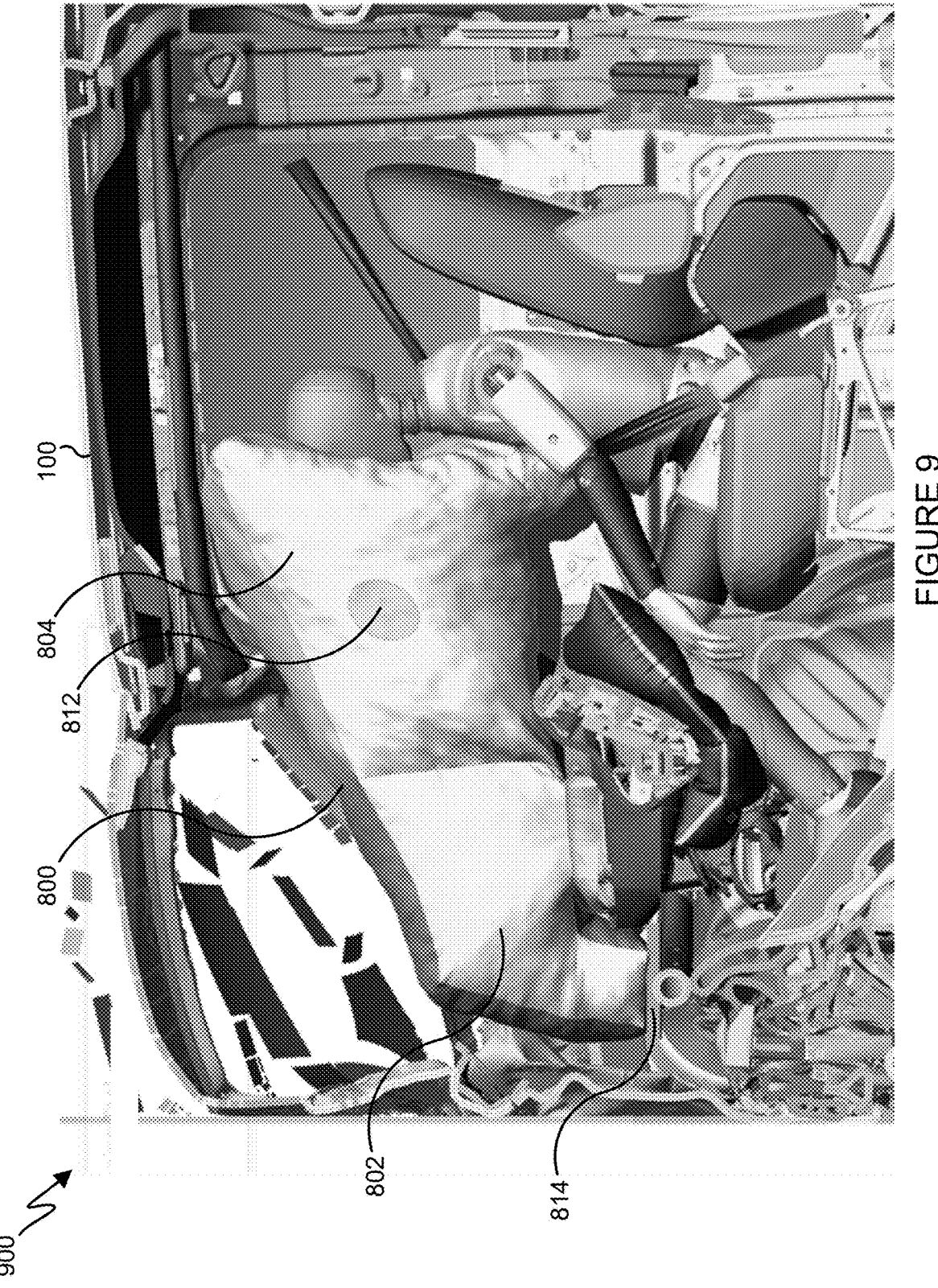
FIG. 9 illustrates an example horizontal passenger airbag deployment event in accordance with this disclosure.

FIG. 9 illustrates an example horizontal passenger airbag deployment event 900 in accordance with this disclosure. For ease of explanation, the horizontal passenger airbag deployment event 900 is described as occurring in the electric vehicle 100 of FIG. 1, and may be described as using the airbag deployment system 200. However, the horizontal passenger airbag deployment event 900 may occur with any other suitable vehicle having a horizontally deploying passenger front airbag, and in with any other suitable system(s).

As shown in FIG. 9, and as also described with respect to FIGS. 8A-8H, during the deployment event 900, the horizontally deploying passenger front airbag 800 inflates such that the rear portion of the airbag 800 comprising the first volume 802 extends to and contacts the LSP 814, and the front portion of the airbag 800 comprising the second volume 804 extends towards the passenger. As also described with respect to FIGS. 8A-8H, the horizontally deploying passenger front airbag 800 also includes an internal vertical separator 806 with a controllable orifice area 808 for managing a pressure difference between the first and second volumes 802, 804. In various embodiments, this allows for the first volume 802 to be at a higher pressure than the second volume 804, such that the first volume 802 can provide strong structural support for the airbag 800 and thus provide a reaction surface for the second volume 804 cushioning the passenger.

Although FIG. 9 illustrates one example horizontal passenger airbag deployment event 900, various changes may be made to FIG. 9. For example, as described above, the dimensions, shape, and volume of the horizontally deploying passenger front airbag 800 could be adjusted based on the environment in which the horizontally deploying passenger front airbag 800 is to be used and deployed. Relatedly, the vehicle 100 can have different characteristics, and a horizontally deploying passenger front airbag 800 could be used in such a different vehicle without departing from the scope of this disclosure.

In some embodiments, various functions described in this patent document are implemented or supported using machine-readable instructions that are stored on a non-transitory machine-readable medium. The phrase "machine-readable instructions" includes any type of instructions, including source code, object code, and executable code.

The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A vehicular airbag deployment system for a vehicle having a cross car beam and a bullhorn beam connected to the cross car beam, comprising:

an airbag storage chamber configured to be connected to the cross car beam;

a launch pad configured to be connected to the bullhorn beam; and an airbag comprising a first volume and a second volume configured to be stored within the airbag storage chamber when the airbag is in a deflated state, the airbag having an internal vertical separator extending vertically from an interior bottom portion to an interior top portion and defining the first volume and second volume, wherein, the airbag is further configured to be inflated in response to a collision detection event and deploy from the airbag storage chamber, and wherein, in an inflated state, the second volume of the airbag extends in a generally horizontal direction from the internal vertical separator towards a passenger seating location and the first volume of the airbag extends horizontally from the internal vertical separator and downwardly towards the launch pad and contacts the launch pad, wherein the launch pad supports the first volume and acts as reaction surface for the second volume during deployment.

2. The vehicular airbag deployment system of claim 1, wherein the internal vertical separator of the airbag includes a controllable orifice area configured to manage a difference in pressure between the first volume and the second volume.

3. The vehicular airbag deployment system of claim 2, wherein a pressure of the first volume is equal to or higher than a pressure of the second volume.

4. The vehicular airbag deployment system of claim 1, wherein the airbag includes:

a front portion comprising the second volume that, when the airbag is in the inflated state, extends towards the passenger seating location; and a rear portion comprising the first volume that, when the airbag is in the inflated state, extends towards the launch pad.

5. The vehicular airbag deployment system of claim 4, wherein the rear portion of the airbag has a height that is shorter than a height of the front portion of the airbag.

6. The vehicular airbag deployment system of claim 5, wherein the height of the front portion of the airbag is configured to extend between a torso of a passenger and a head level of the passenger.

7. The vehicular airbag deployment system of claim 5, wherein a pressure of the first volume of the rear portion of the airbag is higher than a pressure of the second volume of the front portion of the airbag, and wherein the higher pressure of the first volume in conjunction with the launch pad creates a resistance opposite a direction of loading of a passenger against the front portion of the airbag.

8. The vehicular airbag deployment system of claim 1, wherein, when the airbag is in the inflated state, the airbag has a length relative to the generally horizontal direction that exceeds a height of the airbag.

9. The vehicular airbag deployment system of claim 8, wherein the length of the airbag relative to the generally horizontal direction also exceeds a width of the airbag.

10. The vehicular airbag deployment system of claim 1, further comprising:

one or more sensors configured to detect safety parameters of the vehicle; and an airbag control unit configured to:

identify the collision detection event using the detected safety parameters provided by the one or more sensors; and trigger inflation and deployment of the airbag in response to the identification of the collision detection event.

11. The vehicular airbag deployment system of claim 1, wherein a combined volume of the first volume and the second volume of the airbag is approximately 145 liters.

12. A method comprising:

detecting a vehicular collision and triggering a collision detection event; and deploying, in response to the collision detection event, an airbag having a first volume and a second volume stored in a deflated state in an airbag storage chamber connected to a cross car beam within a vehicle, including inflating the airbag to an inflated state, the airbag having an internal vertical separator extending vertically from an interior bottom portion to an interior top portion and defining the first volume and second volume, wherein, in the inflated state, the second volume of the airbag extends generally in a horizontal direction from the internal vertical separator towards a passenger seating location, and wherein, in the inflated state, the first volume of the airbag extends horizontally from the internal vertical separator and downwardly towards a launch pad and contacts the launch pad, wherein the launch pad supports the first volume and acts as a reaction surface for the second volume during deployment, and wherein the launch pad is connected to a bullhorn beam connected to the cross car beam within the vehicle.

13. The method of claim 12, wherein the internal vertical separator of the airbag includes a controllable orifice area managing a difference in pressure between the first volume and the second volume, and wherein a pressure of the first volume is equal to or higher than a pressure of the second volume.

14. The method of claim 12, wherein the airbag includes:

a front portion comprising the second volume that, when the airbag is in the inflated state, extends to the passenger seating location; and a rear portion comprising the first volume that, when the airbag is in the inflated state, extends towards the launch pad.

15. The method of claim 14, wherein the rear portion of the airbag has a height that is shorter than a height of the front portion of the airbag, wherein a pressure of the first volume of the rear portion of the airbag is higher than a pressure of the second volume of the front portion of the airbag, and wherein the higher pressure of the first volume creates a support resistance opposite a direction of loading of a passenger against the front portion of the airbag.

16. The method of claim 12, further comprising:

detecting safety parameters of the vehicle using one or more sensors;

identifying, by an airbag control unit, the collision detection event using the detected safety parameters provided by the one or more sensors; and triggering inflation and deployment of the airbag in response to the identification of the collision detection event.

* * * * *